US012730677B2

(12) United States Patent
Ma et al.

(10) Patent No.: US 12,730,677 B2
(45) Date of Patent: Sep. 8, 2026

(54) EMBEDDED SYSTEM START CONTROL METHOD AND APPARATUS, AND STORAGE MEDIUM AND ELECTRONIC DEVICE

(71) Applicant: SUZHOU METABRAIN INTELLIGENT TECHNOLOGY CO., LTD., Suzhou (CN)

(72) Inventors: Wenkai Ma, Suzhou (CN); Baoyang Liu, Suzhou (CN); Jin Chen, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/571,197

(22) PCT Filed: Apr. 28, 2023

(86) PCT No.: PCT/CN2023/091877
§ 371 (c)(1),
(2) Date: Dec. 15, 2023

(87) PCT Pub. No.: WO2024/221469
PCT Pub. Date: Oct. 31, 2024

(65) Prior Publication Data

US 2026/0037308 A1 Feb. 5, 2026

(51) Int. Cl.
*G06F 9/50* (2006.01)
*G06F 1/20* (2006.01)
*G06F 9/4401* (2018.01)

(52) U.S. Cl.
CPC ............ *G06F 9/5027* (2013.01); *G06F 1/206* (2013.01); *G06F 9/4418* (2013.01);
(Continued)

(58) Field of Classification Search
None
See application file for complete search history.

(56) References Cited

U.S. PATENT DOCUMENTS

2002/0083278 A1* 6/2002 Noyes .................. G06F 9/3004 712/E9.033
2005/0240669 A1* 10/2005 Khanna ............... G06F 11/3447 709/225
(Continued)

FOREIGN PATENT DOCUMENTS

CN 108932160 A 12/2018
CN 112395018 A 2/2021
(Continued)

OTHER PUBLICATIONS

ARM, "AMBA™ Specification (Rev 2.0)" p. 1-226, (Year: 1999).*
(Continued)

*Primary Examiner* — Bradley A Teets
*Assistant Examiner* — Willy W Huaracha
(74) *Attorney, Agent, or Firm* — Merchant & Gould P.C.

(57) ABSTRACT

Disclosed in the present disclosure are an embedded system start control method and apparatus, and a storage medium and an electronic device. The method includes: controlling, via a first bus, a hardware controller of a target device by a first operating system that runs on a first processor core of a processor, so as to control a running state of the target device; booting a second operating system to start on a second processor core of the processor, a response speed of the first operating system is higher than that of the second operating system, the first operating system communicates with the second operating system via a second bus, and a bandwidth of the second bus is higher than a bandwidth of
(Continued)

the first bus; and after the second operating system is started, take over, by the second operating system, the hardware controller via the first bus.

16 Claims, 6 Drawing Sheets

(52) U.S. Cl.
CPC ............ *G06F 9/5016* (2013.01); *G06F 9/441* (2013.01); *G06F 2209/501* (2013.01)

(56) References Cited

U.S. PATENT DOCUMENTS

| | | | | |
|---|---|---|---|---|
| 2008/0155542 | A1* | 6/2008 | Maigne | G06F 9/4555 718/100 |
| 2016/0371094 | A1 | 12/2016 | Higashiyama | |
| 2017/0195282 | A1* | 7/2017 | Teng | H04L 61/5061 |
| 2018/0024963 | A1 | 1/2018 | Dreps | |
| 2019/0065752 | A1* | 2/2019 | Li | G06F 1/3296 |
| 2021/0034376 | A1 | 2/2021 | Kalla | |
| 2021/0334383 | A1* | 10/2021 | Wang | G06F 9/4401 |
| 2022/0147260 | A1* | 5/2022 | Zhang | G06F 3/0619 |

FOREIGN PATENT DOCUMENTS

| | | | |
|---|---|---|---|
| CN | 115357310 | A | 11/2022 |
| JP | 2016157296 | A | 9/2016 |

OTHER PUBLICATIONS

JP2016157296 (A) English Translation (Year: 2016).*

Li et al. "A Light-Weighted Virtualization Layer for Multicore Processor-Based Rich Functional Embedded Systems" 2012 IEEE 15th International Symposium on Object/Component/Service-Oriented Real-Time Distributed Computing (pp. 144-153). (Year: 2012).*

International Search Report and Written Opinion for International Patent Appl. No. PCT/CN2023/091877 mailed Jun. 23, 2023, 10 pgs.

"AMBA Specification (REV2.0)", ARM Announcement, Rev 2.0, May 13, 1999 (May 13, 1999), pp. 1-230, XP007901265.

EP Examination Report issued for EP Patent Application No. 23817641.6 dated Mar. 28, 2025.

Extended European Search Report received for EP Serial No. 23817641.6 on Jun. 13, 2024, 10 pgs.

* cited by examiner

CPUO
CPU1...CPUN
PWM
IIC
Multi-core processor
Brushed/ brushless controller
Brushed/ brushless fan
Temperature sensor

| 0 0 | Target address (8 bit) | 0 | Write length (8 bit) | . . . |
|---|---|---|---|---|

Address rate negotiation bit

Message rate negotiation bit

EMBEDDED SYSTEM START CONTROL METHOD AND APPARATUS, AND STORAGE MEDIUM AND ELECTRONIC DEVICE

CROSS-REFERENCE TO RELATED APPLICATION

The present application is a National Stage Application of PCT International Application No.: PCT/CN2023/091877 filed on Apr. 28, 2023, the disclosure of which is incorporated herein by reference in its entirety.

TECHNICAL FIELD

The present disclosure relates to the field of computers, and specifically, to an embedded system start control method and apparatus, and a storage medium and an electronic device.

BACKGROUND

For devices such as a server, a personal computer, and an industrial personal computer, some specific devices may be equipped to execute operations related to the running of the devices, for example, equipping fans for heat dissipation. In the related art, these specific devices generally start to work after a system is powered on. Since, after the system is powered on, it takes a period of time for the operating system run on the processor to normally take over the specific devices, so as to control the running states of the specific devices, the specific devices are uncontrollable during the starting of the operating system.

In order to control the running state of a specific device during the starting of an operating system, an extra chip is generally used to control the running state of the specific device during the starting of the operating system. However, in the above operating system start control method, device costs are increased due to the addition of the extra chip. Therefore, the operating system start control method in the related art has the problem of high device costs caused by the addition of the extra chip.

SUMMARY

Embodiments of the present disclosure provide an embedded system start control method and apparatus, and a storage medium and an electronic device.

An aspect of an embodiment of the present disclosure provides an embedded system start control method, which includes: via a first bus, a hardware controller of a target device is controlled by a first operating system that runs on a first processor core of a processor, so as to control a running state of the target device, where an embedded system includes the first operating system; a second operating system is booted to start on a second processor core of the processor, where the embedded system includes the second operating system, a response speed of the first operating system is higher than a response speed of the second operating system, the first operating system communicates with the second operating system via a second bus, and a bandwidth of the second bus is higher than a bandwidth of the first bus; and after the second operating system is started, take over, by the second operating system, the hardware controller via the first bus, so as to take over control power of the target device.

Another aspect of an embodiment of the present disclosure provides an embedded system start control apparatus, which includes: a first control unit, configured to control, via a first bus, a hardware controller of a target device by a first operating system that runs on a first processor core of a processor, so as to control a running state of the target device, where an embedded system includes the first operating system; a start unit, configured to boot a second processor core of the processor to start a second operating system, where the embedded system includes the second operating system, a response speed of the first operating system is higher than a response speed of the second operating system, the first operating system communicates with the second operating system via a second bus, and a bandwidth of the second bus is higher than a bandwidth of the first bus; and a first execution unit, configured to, after the second operating system is started, take over, by the second operating system, the hardware controller via the first bus, so as to take over control power of the target device.

In an exemplary embodiment, the first control unit includes: a first execution unit, configured to execute, on the first processor core, a first control task of the first operating system, where the first control task is configured to control the hardware controller; a reading module, configured to read, by means of the first processor core, sensor data of a specific sensor corresponding to the target device; and a first sending module, configured to send, by means of the first control task, a device control instruction to the hardware controller via the first bus according to the sensor data of the specific sensor, so as to cause the hardware controller to control the running state of the target device according to the device control instruction.

In an exemplary embodiment, the first sending module includes: a first determination sub-module, configured to determine, by means of the first control task, a target parameter value of a device running parameter of the target device according to the sensor data of the specific sensor, where the device running parameter is a parameter for controlling the running state of the target device; and a sending sub-module, configured to send, by means of the first control task, the device control instruction carrying the target parameter value to the hardware controller via the first bus.

In an exemplary embodiment, the first determination sub-module includes: a determination sub-unit, configured to, when the target device is a fan, determine, by means of the first control task, a target parameter value of a fan running parameter of the fan according to the sensor data of the specific sensor.

In an exemplary embodiment, the determination sub-unit includes: a determination secondary sub-unit, configured to, when the target device is the fan and the specific sensor is a temperature sensor, determine, by the first control task, a target rotary speed value of rotary speed of the fan according to sensor data of the temperature sensor. The rotary speed of the fan is positively correlated with temperature measured by the temperature sensor.

In an exemplary embodiment, the first execution unit includes: a second sending module, configured to send, by means of the second operating system, a first inter-core interrupt to the first operating system via the second bus, where the first inter-core interrupt is configured to request the second operating system to take over the hardware controller; and a control module, configured to control the hardware controller by means of a second control task of the second operating system via the first bus when a second inter-core interrupt that is returned by the first operating system in response to the first inter-core interrupt and is configured to indicate agreement to take over the hardware controller by the second operating system. The second operating system is configured to control the hardware controller.

In an exemplary embodiment, the apparatus further includes: a second control unit, configured to, after the first inter-core interrupt is sent to the first operating system by means of the second operating system via the second bus, in response to the acquired first inter-core interrupt, control a third control task of the first operating system to hibernate, where the third control task is configured to control the hardware controller; and a first sending unit, configured to when the third control task has been hibernated, send, by the first operating system, the second inter-core interrupt to the second operating system via the second bus.

In an exemplary embodiment, the apparatus further includes: a second execution unit, configured to, when the third control task has been hibernated, push system running data of the first operating system into a stack. The second inter-core interrupt is further configured to instruct the second operating system to take over the first processor core.

In an exemplary embodiment, the apparatus further includes: a wake-up unit, configured to, before the hardware controller of the target device is controlled, via the first bus, by the first operating system that runs on the first processor core of the processor, after a chip where the processor is located is powered on, wake up the first processor core by the processor; and a running unit, configured to run a boot loader of the first operating system by the first processor core, so as to boot the first operating system to start on the first processor core.

In an exemplary embodiment, the start unit includes: a second execution module, configured to execute a Second Program Loader (SPL) by the first processor core, so as to cause the SPL to wake up the second processor core; and a running module, configured to run a Universal Boot Loader (U-Boot) of the second operating system by the second processor core, so as to boot the second operating system to start on the first processor core.

In an exemplary embodiment, the apparatus further includes: a third execution unit, configured to, after the hardware controller is taken over by the second operating system via the first bus, when the second operating system waits for restart, wake up the first operating system by the second operating system via the second bus, and take over the hardware controller by the first operating system via the first bus, so as to take over the control power of the target device; and a third control unit, configured to control the second operating system to perform system restart.

In an exemplary embodiment, the third execution unit includes: an initiation module, configured to, when the second operating system waits for restart, initiate a system wake-up interrupt to the first operating system by the second operating system via the second bus. The system wake-up interrupt is configured to wake up the first operating system.

In an exemplary embodiment, the apparatus further includes: a first allocation unit, configured to allocate, according to a dynamic resource allocation rule, a group of services to be allocated to the corresponding operating system in the first operating system and the second operating system, where the dynamic resource allocation rule includes performing dynamic resource allocation according to at least one of the following: a service response speed, a service resource occupation rate, a service coupling degree, or service importance; a first determination unit, configured to determine resource allocation results corresponding to the group of services to be allocated, where the resource allocation results are configured to indicate a processing resource corresponding to each of the group of services to be allocated in processing resources of the processor, and the processing resources of the processor include processor cores; and a second allocation unit, configured to allocate the processing resources of the processor to the first operating system and the second operating system according to the operating system corresponding to each service to be allocated and the resource allocation results.

In an exemplary embodiment, the first allocation unit includes at least one of the following: a first allocation module, configured to allocate, to the first operating system, services to be allocated of which service response speed in the group of services to be allocated is required to be greater than or equal to a set response speed threshold, and allocate, to the second operating system, services to be allocated of which the service response speed in the group of services to be allocated is required to be less than the set response speed threshold; a second allocation module, configured to allocate, to the first operating system, services to be allocated of which service resource occupation rate in the group of services to be allocated is less than a first occupation rate threshold, and allocate, to the second operating system, services to be allocated of which service resource occupation rate in the group of services to be allocated is greater than or equal to the first occupation rate threshold; or a third allocation module, configured to allocate, to a target operating system, services to be allocated in the group of services to be allocated that include sensitive information. The target operating system is an operating system in the first operating system and the second operating system that has a low frequency of interaction with a use object.

In an exemplary embodiment, the first allocation unit includes at least one of the following: a fourth allocation module, configured to allocate, to the first operating system, services to be allocated in the group of services to be allocated that have a service coupling degree with allocated services of the first operating system being greater than or equal to a first coupling degree threshold; or a fifth allocation module, configured to allocate, to the second operating system, services to be allocated in the group of services to be allocated that have a service coupling degree with allocated services of the second operating system being greater than or equal to a second coupling degree threshold.

In an exemplary embodiment, the first determination unit includes: a generation module, configured to, according to allocation results of the group of services to be allocated, in combination with resource utilization of processing resources of the first operating system and resource utilization of processing resources of the second operating system, generate a resource mapping table of the group of services to be allocated and the processing resources of the processor.

In an exemplary embodiment, the second allocation unit includes: a sixth allocation module, configured to, when it is determined, according to the resource allocation results, that there are corresponding services to be allocated in unallocated processing resources in the processing resources of the processor, allocate the unallocated processing resources to the operating system to which the services to be allocated corresponding to the unallocated processing resources are allocated.

In an exemplary embodiment, the apparatus further includes: a second sending unit, configured to send, by the first operating system, target data to a target virtual channel in a memory of the processor; a third sending unit, configured to send an interrupt notification message to the second operating system; and an acquisition unit, configured to acquire, by the second operating system, the target data from the target virtual channel in the memory in response to the interrupt notification message.

In an exemplary embodiment, the memory includes a data storage area and a metadata storage area. The data storage area is divided into a plurality of storage units, and each storage unit is configured to store service data. The metadata storage area is configured to store size and occupied state of the each storage unit of the data storage area.

In an exemplary embodiment, the second sending unit includes: a third execution module, configured to read records in the metadata storage area by the first operating system, and determine, according to the read records, at least one storage unit that is in an idle state in the data storage area and has a total space being greater than or equal to the length of the target data, so as to obtain the target virtual channel; and a fourth execution module, configured to set, to the occupied state, a state of each of the at least one storage unit corresponding to the target virtual channel in the metadata storage area, and store the target data to the target virtual channel.

In an exemplary embodiment, the acquisition unit includes: a fifth execution module, configured to read the records in the metadata storage area by the second operating system, and determine the target virtual channel according to the read records; and a sixth execution module, configured to acquire the target data from the at least one storage unit corresponding to the target virtual channel, and set the state of the at least one storage unit to the idle state.

In an exemplary embodiment, the data storage area includes a plurality of memory channels, and each memory channel is formed by one or the plurality of storage units. The metadata storage area stores a plurality of records, and each record is configured to record metadata of one memory channel. The metadata of each memory channel at least includes a channel ID of the memory channel, the size of the memory channel, and the occupied state of the memory channel. The third execution module includes: a first traversing sub-module, configured to traverse the records stored in the metadata storage area, and determine whether there is a first target record indicating that the memory channel is in the idle state and the size of the memory channel is greater than or equal to the length of the target data; and a second determination sub-module, configured to, when there is the first target record, determine, as the target virtual channel, the memory channel indicated by the channel ID recorded in the first target record.

In an exemplary embodiment, when the memory channel is occupied, the metadata of the memory channel further includes a ID of a source CPU core of the target data and a ID of a destination CPU core of the target data. The fifth execution module includes: a second traversing sub-module, configured to traverse the records stored in the metadata storage area, and determine whether there is a second target record, where the second target record indicates that the memory channel is in the occupied state, and the ID of the destination CPU core is a ID of a CPU core of the second operating system, and the ID of the source CPU core is not the ID of the CPU core of the second operating system; and a third determination sub-module, configured to, when there is the second target record, determine, as the target virtual channel, the memory channel indicated by the channel ID recorded in the second target record.

In an exemplary embodiment, the apparatus further includes: a fourth execution unit, configured to receive a memory request instruction of the first operating system, and execute a locking operation on the memory of the processor, where the memory request instruction is configured to request to use the memory of the processor; a fifth execution unit, configured to, when the memory is successfully locked, read the occupied state of the memory, and determine, according to the occupied state of the memory, whether there is an idle target memory space in the memory, where the size of the target memory space is greater than or equal to the size of the memory requested by the memory request instruction; and a feedback unit, configured to, when there is the target memory space in the memory, feed back address information of the target memory space to the first operating system, and update the occupied state of the memory.

In an exemplary embodiment, the memory includes a metadata storage area and a data storage area; the data storage area is configured to store service data; the metadata storage area stores a state mapping table, and the state mapping table is configured to record an occupied state of the data storage area. The fifth execution unit includes: a seventh execution module, configured to read records in the state mapping table from the metadata storage area, and determine, according to the records in the state mapping table, whether there is the target memory space in the data storage area.

In an exemplary embodiment, the apparatus further includes: a determination unit, configured to, before the locking operation is executed on the memory of the processor, determine whether the memory is currently in a locked state, where the locked state represents that the memory is in a state of being requested for use; and a sixth execution unit, configured to, when the memory is currently not in the locked state, execute the locking operation on the memory.

In an exemplary embodiment, the apparatus further includes: a releasing unit, configured to, after the occupied state of the memory is read, and whether there is the idle target memory space in the memory is determined according to the occupied state of the memory, release the locking of the memory when there is no the idle target memory space in the memory.

Still another aspect of an embodiment of the present disclosure further provides an embedded system. The embedded system includes a chip and at least two operating systems. The chip includes a processor, a hardware controller, a first bus, and a second bus. A bandwidth of the second bus is higher than a bandwidth of the first bus. The second bus is configured as a multi-master and multi-slave mode, and the first bus is configured as a one-master and multi-slave mode. The at least two operating systems run on the basis of the processor. Processing resources of the processor are dynamically allocated to the at least two operating systems, and the processing resources of the processor include processor cores. The at least two operating systems communicate with each other by means of the second bus. The at least two operating systems control the hardware controller by means of the first bus; and the at least two operating systems are configured to implement steps in the above method embodiments.

Still aspect of an embodiment of the present application further provides a chip. The chip includes a programmable logic circuit and at least one of executable instructions. The chip runs in an electronic device and is configured to implement steps in the above method embodiments.

Still aspect of an embodiment of the present application further provides a Baseboard Management Controller (BMC) chip, which includes a storage unit and a processing unit connected to the storage unit. The storage unit is configured to store a program; and the processing unit is configured to run the program to execute steps in the above method embodiments.

Still aspect of an embodiment of the present application further provides a mainboard. The mainboard includes: at least one processor; and at least one memory, configured to store at least one program. When the at least one program is executed by the at least one processor, the at least one processor is enabled to implement steps in the above method embodiments.

Still aspect of an embodiment of the present application further provides a server, which includes a processor, a communication interface, a memory, and a communication bus. The processor, the communication interface, and the memory communicate with each other by means of the communication bus. The memory is configured to store a computer program. The processor is configured to execute steps in the above method embodiments when executing the program stored in the memory.

Still aspect of an embodiment of the present application further provides a computer-readable storage medium. The computer-readable storage medium stores a computer program. Steps in the above method embodiments are executed when the computer program is configured to run.

Still aspect of an embodiment of the present application further provides an electronic device. The electronic device includes a memory and a processor. The memory is configured to store a computer program. The processor is configured to run the computer program to execute steps in the above method embodiments.

BRIEF DESCRIPTION OF THE DRAWINGS

Drawings here are incorporated into the specification and constitute a part of the specification. The drawings illustrate embodiments in accordance with the present application and serve to understand the principles of the present application together with the specification.

In order to more clearly illustrate the embodiments of the present application or the technical solutions in the prior art, the drawings used in the description of the embodiments or the prior art will be briefly described below. It is apparent that other drawings can be obtained from those skilled in the art according to these drawings without any creative work.

DETAILED DESCRIPTION OF THE EMBODIMENTS

In order to enable those skilled in the art to better understand the solutions of the present application, the technical solutions in the embodiments of the present application will be clearly and completely described below in combination with the drawings in the embodiments of the present application. It is apparent that the described embodiments are only part of the embodiments of the present application, not all the embodiments. All other embodiments obtained by those of ordinary skill in the art on the basis of the embodiments in the present application without creative work shall fall within the scope of protection of the present application.

It is to be noted that terms “first”, “second” and the like in the description, claims and the above drawings of the present application are used for distinguishing similar objects rather than describing a specific sequence or a precedence order. It should be understood that the data used in such a way may be exchanged where appropriate, in order that the embodiments of the present application described here can be implemented in an order other than those illustrated or described herein. In addition, terms “include” and “have” and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

Figure 1:
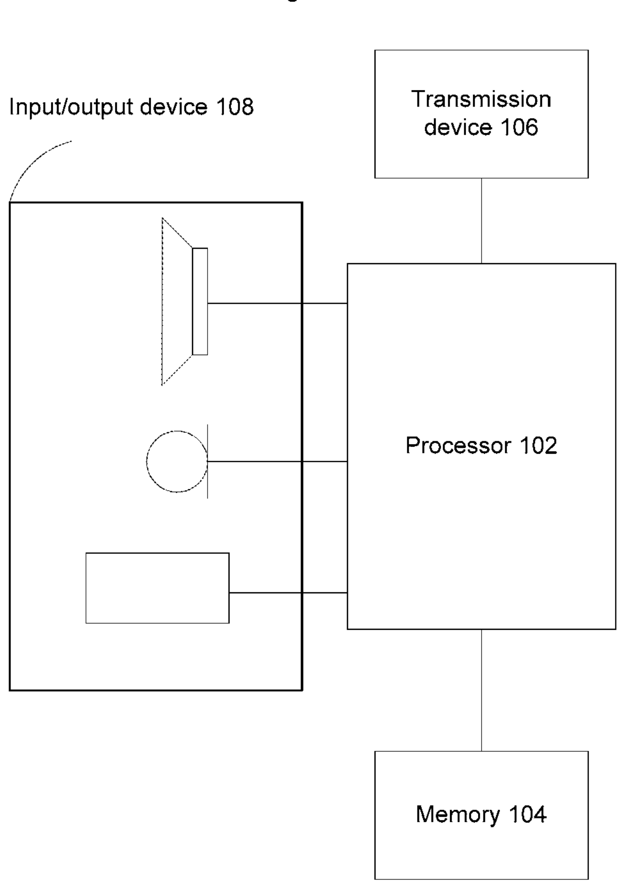
FIG. 1 is a schematic diagram of a hardware environment of an embedded system start control method according to an embodiment of the present application.

The method embodiments provided in the embodiments of the present application may be executed in a server, a computer terminal, a device terminal, or a similar computing apparatus. Taking running on the server as an example, FIG. 1 is a schematic diagram of a hardware environment of an embedded system start control method according to an embodiment of the present application. As shown in FIG. 1, the server may include one or more (there is only one shown in FIG. 1) processors 102 (the processors 102 may include, but are not limited to, processing apparatuses such as microprocessors MCU or programmable logic devices FPGA) and a memory 104 configured to store data. In an exemplary embodiment, the server may further include a transmission device 106 configured to achieve a communication function and an input/output device 108. Those skilled in the art may understand that the structure shown in FIG. 1 is only for schematic purposes, which does not limit the structure of the above server. For example, the server may further include more or less components than those shown in FIG. 1, or have different configurations that are equivalent or more functional than those shown in FIG. 1.

The memory 104 may be configured to store a computer program, for example, a software program and a module of application software, such as a computer program corresponding to an embedded system start control method in the embodiments of the present disclosure. The processor 102 runs the computer program stored in the memory 104, so as to execute various functional applications and data processing, that is, to realize the above method. The memory 104 may include a high-speed random access memory, and may further include a non-volatile memory, such as one or more magnetic disk memory apparatuses, a flash memory device, or other non-volatile solid-state memory devices. In some embodiments, the memory 104 may further include memories remotely disposed relative to the processor 102. These remote memories may be connected to a server via a network. Examples of the above network include, but are not limited to, the Internet, an intranet, a local area network, a mobile communication network, and a combination thereof.

The transmission device 106 is configured to receive or transmit data via a network. The specific example of the above network may include a wireless network provided by a communication provider of the server. In an example, the transmission device 106 includes a Network Interface Controller (NIC), and may be connected to other network devices by using a base station, so as to communicate with the Internet. In an example, the transmission device 106 is a Radio Frequency (RF) module, which is configured to communicate with the Internet in a wireless manner.

Figures 2, 3:
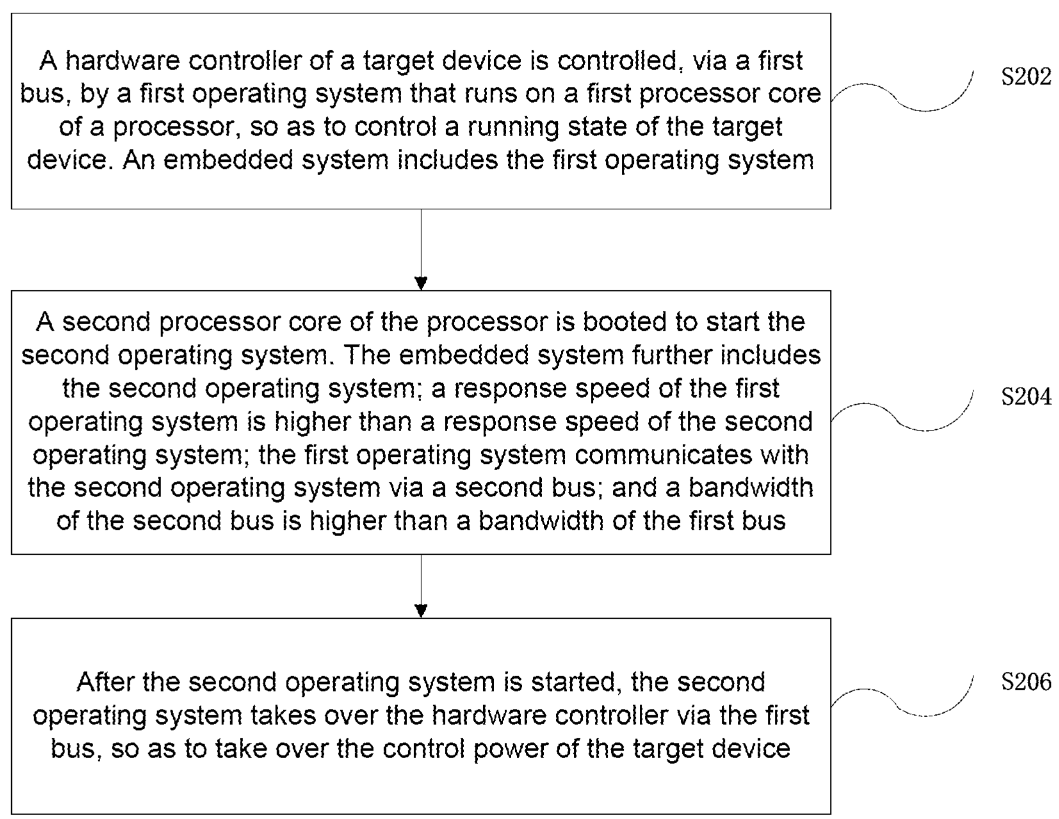
FIG. 2 is a schematic flowchart of an optional embedded system start control method according to an embodiment of the present application.
FIG. 3 is a schematic diagram of an fan controller according to an embodiment of the present application.

This embodiment provides an embedded system start control method. The method is applied to the processor. FIG. 2 is a schematic flowchart of an optional embedded system start control method according to an embodiment of the present application. As shown in FIG. 2, the flow includes the following steps.

At S202, a hardware controller of a target device is controlled, via a first bus, by a first operating system that runs on a first processor core of a processor, so as to control a running state of the target device. An embedded system includes the first operating system.

The embedded system start control method in this embodiment may be applied to in a scenario of controlling a running state of a specific device by running the operating system on the processor core of the processor, which may correspond to a start process of the embedded system. The embedded system may be an embedded heterogeneous multi-system. The heterogeneous multi-system refers to various different operating systems (for example, the first operating system and the second operating system) that run in the multi-core processor of the embedded system; and these operating systems simultaneously run in the same embedded system. Different operating systems may run on different processor cores. The processor here may be the multi-core processor, such as an 8-core processor, or may be a processor including other number of processor cores. In this embodiment, the number of the cores included in the multi-core processor is not limited.

For devices such as a server, a personal computer, and an industrial personal computer, some specific devices may be equipped to execute operations related to the running of the devices. In the related art, these specific devices generally start to work after a system is powered on. Since, after the system is powered on, it takes a period of time for the operating system run on the processor to normally take over the specific devices, so as to control the running states of the specific devices, the specific devices are uncontrollable during the starting of the operating system.

For example, a fan starts to work after the system is powered on; since it takes a period of time for the operating system run on a Central Processing Unit (CPU, which is used as an operation and control core of a computer system, and the CPU is a final execution unit for information processing and program running) to normally take over the fan after the system is powered on, so as to set a rotary speed of the fan, the fan is uncontrollable during the starting of the operating system.

In the related art, in order to control the running state of the specific device during the starting of the operating system, an extra chip is generally used to control the running state of the specific device during the starting of the operating system. The extra chip may be a Complex Programmable Logic Device (CPLD), an Embedded Controller (EC) chip, a custom chip, etc. The main reason for using the extra chip is that the CPLD, the EC chip and the custom chip may be started within a very short time (for example, 1 second), such that the extra chip is higher in real-time performance. However, these three modes often require the extra chip or the CPLD, resulting in an increase in cost; and the chip does not have extendibility because the chip is custom hardware.

For example, in order to control the fan during the starting of the operating system, the server uses a control mode of combining a BMC (which is a management control chip in a server platform) and CPLD; the personal computer uses a control mode of an EC chip (the EC chip adjusts the function of the rotary speed of the fan according to temperatures); and the industrial personal computer uses a control mode of a custom chip. During the starting of server, personal computer and industrial personal computer operating systems, the CPLD, the EC chip and the custom chip step in to control the rotary speed of the fan; and after the operating system is completely started, the control power of the fan is handed over to an application program in the operating system for controlling.

In order to at least partially solve the above technical problems, a start control mode of a multi-core multi-system (for example, a multi-core dual system) may be used to run different operating systems of an embedded system on different processor cores of the processor. Different operating systems have different response speeds. When the second operating system is not started or restarted or the running states of the specific devices cannot be controlled, the running states of the specific devices may be controlled by the first operating system of which response speed is higher than that of the second operating system, such that uncontrollable situations of the running states of the specific devices may be reduced. In addition, since extra costs do not need to be added, good extendibility is also achieved.

The embedded system may run on the processor; and the processor may be the multi-core processor (for example, eight-core processor), and may include a plurality of processor cores. The embedded system may include the first operating system and the second operating system. The first operating system may run on the first processor core of the processor; and the second operating system may run on the second processor core of the processor. The first processor core may be the at least one processor core of the processor; and the second processor core may be all or part of the processor cores other than the first processor core in the plurality of processor cores of the processor. In addition to the processor cores, the processor resources running each operating system may further include other types of resources, such as a controller logic unit. In addition, the processor cores occupied by different operating systems may be dynamically adjusted.

The processor may be a processor on a certain chip. The chip may include the processor, the hardware controller, the first bus, and the second bus. The hardware controller may be configured to control an external device connected to a corresponding external interface. The first bus may be configured to be in a one-master and multi-slave mode, and may be a bus used by the processor for control of the hardware controller, for example, an Advanced High Performance Bus (AHB). The second bus is configured to be in a multi-master and multi-slave mode, and may be a bus used for communication among the plurality of cores of the processor 302, for example, an Advanced Peripheral Bus (APB). The bandwidth of the second bus is higher than the bandwidth of the first bus.

Herein, the second bus being configured to be in the multi-master and multi-slave mode means that the second bus may be configured to perform data communication between a plurality of master devices and a plurality of slave devices, that is, the second bus may be connected to the plurality of master devices and the plurality of slave devices, and the second bus may be used between the master devices, and between the slave devices for data communication. Data transmission on the entire second bus is sent by the master devices, and responded to by the slave devices. The first bus being configured to be in the one-master and multi-slave mode means that the first bus may be configured to perform data communication between one master device and the plurality of slave devices, that is, the first bus may be connected to one master device and the plurality of slave devices, and the first bus may be used between the master device and the slave devices for data communication. A data request can only be sent from the master device to the slave devices, and then the slave devices return corresponding response data to the master device after receiving the request. This process may implement one-to-many access.

It is to be noted that, by using the bus in the multi-master and multi-slave mode between the operating systems for data communication, each operating system may conveniently actively initiate the data request according to needs; and the hardware controller mainly controls corresponding hardware on the basis of the control of the operating system, such that the bus in the one-master and multi-slave mode is used between the operating system and the hardware controller for communication, and the data request is sent to the hardware controller by the operating system. Therefore, the control efficiency of the hardware controller may be improved.

The AHB has been defined in Advanced Microcontroller Bus Architecture (AMBA) 2. The AHB is mainly used as a system high-speed bus, is suitable for high-performance and low power consumption system design, and may be configured to achieve, as a System on Chip (SoC) bus of an SoC, a connection between high-performance modules. The high-performance module may be a CPU, Direct Memory Access (DMA), Digital Signal Processing (DSP). In an AMBA protocol, the AHB is mainly designed for system-level high-bandwidth and high-performance system interconnections, and includes the following characteristics: single clock edge operation; a non-tristate implementation; supporting burst transmission; supporting segmented transmission; supporting a multi-master and multi-slave interconnection mode; being capable of configuring 32-bit" 128-bit bus widths; and supporting transmission of bytes, half bytes, and words. The AHB system includes the following three parts: a master module (that is, the master device), a slave module (that is, the slave device), and an infrastructure; and transmissions throughout the entire AHB bus are sent by the master module, and the slave module is responsible for response. The infrastructure may include an arbiter, a master-to-slave multiplexer, a slave-to-master multiplexer, a decoder, a dummy slave, and a dummy master.

The APB is mainly configured to achieve a connection between peripheral devices with low bandwidths, for example, Universal Asynchronous Receiver/Transmitter (UART) and 1284. The bus architecture of the APB is not like AHB which supports a plurality of master modules, the only master module inside the APB is an APB bridge. The characteristics of the APB include the following.

1) The APB may be operated at a high frequency.
2) The APB is simple in protocol, and has no complex time sequence.
3) Synchronous bus: all transactions (reading and writing operations) on the bus rely on a rising edge of a clock.
4) One-master and multi-slave mode: the APB is hung under an AHB system, a transaction is converted between the AHB systems by means of an AHB-APB Bridge, and in this case, the Bridge is the master of the APB, and other periphery devices are all slaves.
5) Simple interface: an interface is relatively simple compared to an Advanced extensible Interface (AXI) and the AHB.
6) The power consumption is low.
7) Various periphery devices may be connected, such as the periphery device that may be controlled by the hardware controller.

For the APB, the data request can only be sent from the Master to the slave; and the slave returns the corresponding response data to the master after receiving the request. One-to-many access may be implemented in this process; and the access may not involve arbitration and decoder analysis operations in the AHB. Herein, the AHB has the characteristics of being high in bandwidth, and is configured to achieve an interconnection between the high-performance modules (such as the CPU and the DMA); and the APB is relatively low in bandwidth, and is configured to achieve a connection between the periphery devices (such as the UART and the I2C) in a system. The AHB is complex in logic circuit and bus protocol; and the APB is relatively simple in interface circuit and bus protocol.

Herein, the chip may be the BMC chip. The BMC chip may be an SOC chip on the basis of a multi-architecture of an Advanced RISC Machine (ARM, and integrated with various periphery hardware Intelligent Peripherals (IP); and the BMC chip is placed on a mainboard (a server motherboard).

Optionally, on the basis of constraints on response time, the first operating system may be an operating system that has a clear fixed time constraint. All processing processes (task scheduling) need to be completed within the fixed time constraint, otherwise, the system makes an error. The first operating system may be called a Real Time Operating System (RTOS). The second operating system does not have the characteristic. The second operating system generally uses a fair task scheduling algorithm. When the number of threads/processes is increased, CPU time needs to be shared. Task scheduling is uncertain, and may be called a non-RTOS, such as a Linux (also known as GNU/Linux) system and a Windows system. The Linux system is a freely distributable Unix-like operating system, and is a multi-user, multi-task, multi-threaded, and multi-CPU operating system based on a Portable Operating System Interface (POSIX). The Windows system is an operating system that is developed on the basis of a graphical user interface, and is mainly applied to devices such as computers and smart phones.

For example, by using a processor chip of the ARM architecture as an example, the processor chip may be an ARM processor. The processor includes a multi-core CPU. The RTOS may run on a CPU0 core; and the Linux system may run on a CPU core (1, N) (N≥2, the total number of the processor core included in the processor is N+1) (Windows or other operating systems may also run).

In this embodiment, when the second operating system is not started or restarted or the running states of the specific devices cannot be controlled, the hardware controller of the target device may be controlled by the first operating system via the first bus, so as to control the running state of the target device. The target device here may be the fan or other devices that are required to run when the system is started. For the fan, the corresponding hardware controller is a fan controller, such as a Pulse Width Modulation (PWM) controller and a FanTach controller. Herein, by using the first operating system (for example, RTOS) to replace traditional CPLD, EC chip and custom chip, in one aspect, hardware costs are reduced, and in the other aspect, since device control is implemented by software, higher extendibility is achieved.

For example, a dual system, the RTOS and the Linux system are implemented on the basis of a BMC dual core; and the fan is implemented on the basis of the multi-core dual system. By using the high real-time nature of the RTOS, during the starting of the Linux system, the fan may be controlled by replacing the CPLD, the EC chip and the custom chip with the RTOS, that is, taking over the control power of the fan, such that a running state of the fan is controlled at a fast enough speed.

At S204, a second processor core of the processor is booted to start the second operating system.

When the system is powered on or the second operating system is restarted, the second processor core of the processor may be booted to start the second operating system, so as to cause the second operating system to run on the second processor core. Herein, starting the second operating system on the second processor core means that the second processor core is scheduled to the second operating system. A system file or a mirror file of the operating system may be stored on the chip where the processor is located or in memories other than the chip, for example, in an external Random Access Memory (RAM).

At S206, after the second operating system is started, the second operating system takes over the hardware controller via the first bus, so as to take over the control power of the target device.

After the starting of the second operating system is completed, the running state of the target device may always be controlled by the first operating system. Considering that running a plurality of operating systems on a multi-core processor needs to perform data interaction among the plurality of operating systems, so as to cause one operating system to conveniently perform overall control of the device, the control power of the target device may also be taken over by the second operating system. For example, the hardware controller may be taken over by the second operating system via the first bus. The method that the second operating system takes over the control power of the target device may include: after the second operating system is started, sending, by the second operating system, a device takeover request to the first operating system. For example, the interrupt request is sent by a second bus, so as to request to take over the hardware controller of the target device. The first operating system may receive the device takeover request sent by the second operating system, hand over the control power of the target device to the second operating system, and may also execute operations related to the transfer to the control power of the target device, for example, stopping running a service (process) for controlling the running state of the target device.

For example, after the Linux system is completely started, the RTOS hands over the control power of the fan to the Linux system, and then the fan is controlled by the Linux system. The above process may be executed after the system is powered on, that is, the start mode of the multi-core dual system is used; the RTOS is first started, facilitating earlier stepping-in of fan control; and then after the Linux system is completely started, the RTOS hands over the control power of the fan to the Linux system for controlling.

Herein, it is to be noted that, for the server, the server is at least highly scalable and stable. As an enterprise network is not possible to remain unchanged for a long time, for the network information technology today, if the server does not have certain extendibility, the use of the server in the enterprise is affected, thereby affecting the future development of the enterprise, such that the extendibility becomes the most basic characteristics required for servers, and later better utilization can be guaranteed when higher extendibility is realized. In addition to hardware extendibility, the extendibility also includes software extendibility, because the functions of the server are still very complex compared with a computer, it is important not only in the hardware configuration, but also in software configuration. Trying to achieve more functionality is also unthinkable without full software support.

In addition, since the server needs to process a large amount of data to support the continuous running of the services, the server also has a very important feature, for example, high stability, and if data transmission of the server cannot run stably, it will undoubtedly have a great impact on the services.

In the solution of the present application, by using the characteristics of the server of high extendibility, a dual software system of the first operating system and the second operating system is introduced and configured to generate a hardware interface signal; and meanwhile, hardware devices such as the GPLD and the BMC chip may also be introduced and respectively configured to adjust a transmission voltage of the hardware interface signal, and monitor the running states of other devices inside the server. Based on this, it may be learned that, in the present application, the manner of generating, by the first operating system, the hardware interface signal corresponding to the request command is used to first acquire the request command through the first operating system; then the plurality of pieces of logical bit information corresponding to the request command are determined; and finally, the hardware interface signal corresponding to the request command is generated according to the plurality of pieces of logical bit information and the timer. From the above content, it may be learned that, in the present application, the hardware interface signal corresponding to the request command is generated by the first operating system, such that the technical effect of simulating the generation of the hardware interface signal in a software manner is realized. Therefore, the purpose that the chip does not need to have the hardware logic design of the related hardware interface signal is achieved, the design difficulty of the chip can be reduced, and the design cost of the chip can also be reduced. In the present application, the purpose of using a software system to generate the hardware interface signal without performing hardware logic design of the hardware interface signal on the chip is achieved, such that the design difficulty of the chip is reduced, thereby solving the technical problem in the related art of high design cost of the chip caused by the requirement of the chip for the hardware logic design of the controller.

In addition, the stability of the server can also be guaranteed by introducing the dual software system of the first operating system and the second operating system. Since the service response speed of the second operating system is less than the service response speed of the first operating system, the first operating system with faster service response speed is used to generate the hardware interface signal, and the generation of the hardware interface signal is not interrupted, such that it is ensured that the hardware interface signal can be continuously and stably outputted.

Through S202 to S206, the hardware controller of the target device is controlled, via the first bus, by the first operating system that runs on the first processor core of the processor, so as to control the running state of the target device; and the embedded system includes the first operating system. The second operating system is booted to start on the second processor core of the processor; the embedded system further includes the second operating system; the response speed of the first operating system is higher than that of the second operating system; the first operating system communicates with the second operating system via a second bus; and a bandwidth of the second bus is higher than a bandwidth of the first bus. After the second operating system is started, the hardware controller is taken over by the second operating system via the first bus, so as to take over control power of the target device. Therefore, the problem that an operating system start control method in the related art is high in device cost due to the addition of an extra chip is solved, hardware costs are reduced, and the extendibility of device control is improved.

In an exemplary embodiment, before the hardware controller of the target device is controlled, via the first bus, by the first operating system that runs on the first processor core of the processor, the method further includes the following steps.

At S11, after a chip where the processor is located is powered on, the first processor core is woken up by the processor.

At S12, a boot loader of the first operating system is run by the first processor core, so as to boot the first operating system to start on the first processor core.

The entire system may be divided into two phases according to working time periods, which are an initial start phase and a real-time running phase. A start control method in this embodiment may be executed at the initial start phase and the real-time running phase. For the initial start phase, the initial start phase starts when the system is powered on, that is, the chip where the processor is located is powered on. After the system is powered on, one core is woken up to execute a booting action of the operating system, and the rest of the cores are in a hibernation state temporarily. The woken core may be the first processor core.

Optionally, after being powered on, the system first executes a preset core scheduling strategy (a start booting strategy). That is to say, the core scheduling strategy is executed by one processor core of the processor. The core scheduling strategy may be stored in an RAM or a non-volatile flash memory (Norflash) on an SOC. The scheduling strategy may be flexibly configured according to different design requirements. The main functions of the scheduling strategy include: specify initial processing resources (processor cores) that need to be run for different operating systems, and determining a booting process of the heterogeneous operating systems, where the powering-on of the chip may refer to powering-on at an SOC level.

Optionally, the chip may be the BMC chip (which is a management control chip in a server platform), and refers to the SOC chip on the basis of a multi-architecture of an ARM, and is integrated with various periphery hardware IPs; and the BMC chip is placed on a mainboard (a server motherboard). The powering-on of the chip refers to powering-on at an SOC level.

After the first processor core is woken up, the first operating system may be booted to run on the first processor core by means of the boot loader; and the first processor core may boot the first operating system to start on the first processor core by means of the boot loader. The boot loader may be located on a computer or other computer applications, and refers to a program that is used to boot the operating system to load, for example, an inherent program in Boot Rom. The inherent program refers to codes that boot the operating system to start, and belongs to a Boot Loader program. The Boot Rom is a small mask Read-Only Memory (ROM) or a write-protect flash memory in an embedded processor chip on the CPU.

By means of this embodiment, at the initial start phase, by using the boot loader to boot the operating system to start on the corresponding processor core, the success rate of the starting of the operating system may be improved, and preparation is made for the real-time running phase.

In an exemplary embodiment, the step of controlling, via the first bus, the hardware controller of the target device by the first operating system that runs on the first processor core of the processor includes the following steps.

At S21, a first control task of the first operating system is executed on the first processor core, and the first control task is configured to control the hardware controller.

At S22, sensor data of a specific sensor corresponding to the target device is read by means of the first processor core.

At S23, a device control instruction is sent, by means of the first control task, to the hardware controller via the first bus according to the sensor data of the specific sensor, so as to cause the hardware controller to control the running state of the target device according to the device control instruction.

In this embodiment, the control of the hardware controller of the target device by the operating system may be executed by controlling the hardware controller by a control task (service) on the processor core run by the operating system. The control task here may refer to the corresponding control task. For the hardware controller of the target device, the first control task (first control process) of the first operating system may be executed on the first processor core, and the hardware controller is controlled by the first control task.

The control of the hardware controller may be performed on the basis of the sensor data of the sensor. For different target devices, parameters affecting the running of the target devices are different; and correspondingly, there may be differences in the sensor data to be acquired. The target device may be a device that runs after the chip is powered on, and the sensor corresponding to the target device is the specific sensor. There may be various types of the specific sensors, which may, but is not limited to, include at least one of the following: a temperature sensor, a humidity sensor, or a noise sensor. The first control task is run on the first processor core, such that the sensor data of the specific sensor may be read by the first processor core. The sensor data of the specific sensor may be stored in a storage space in the specific sensor, and may be transmitted to a specified storage space by the specific sensor. A reading position of the sensor data of the specific sensor is not limited in this embodiment.

The read sensor data of the specific sensor may be sensor data within a time period, or may be all the sensor data since the target device is started, and may also be the sensor data that meets other time-limited conditions. After the sensor data of the specific sensor is acquired, the first control task may control the running state of the target device according to the sensor data of the specific sensor. The control of the running state of the target device may be implemented by the following method, including: sending, by the first control task, the device control instruction to the hardware controller of the target device, so as to cause the hardware controller to control the running state of the target device according to the device control instruction.

Optionally, the first control task may determine an expected running state of the target device on the basis of the sensor data of the specific sensor; insofar as the current running state of the target device is different from the expected running state, the device control instruction may be generated; and the device control instruction may control and adjust the running state of the target device to the expected running state. The device control instruction may be sent to the hardware controller of the target device via the first bus. The first bus is similar to that in the foregoing embodiments, and is not described herein again.

By means of this embodiment, the utilization rate of resources is improved by reading the sensor data of the specific sensor, and controlling the target device according to the sensor data, so as to control the running state of the target device.

In an exemplary embodiment, the step of sending, by means of the first control task, the device control instruction to the hardware controller via the first bus according to the sensor data of the specific sensor includes the following steps.

At S31, a target parameter value of a device running parameter of the target device is determined by means of the first control task according to the sensor data of the specific sensor, and the device running parameter is a parameter for controlling the running state of the target device.

At S32, the device control instruction carrying the target parameter value is sent by means of the first control task to the hardware controller via the first bus.

In this embodiment, the first control task may determine the expected running state of the target device according to the sensor data of the specific sensor. The expected running state may be represented by a parameter value of the device running parameters. The device running parameters may be parameters for controlling the running state of the target device. For different types of devices, the corresponding device running parameters may be different. For example, for the fan, the corresponding device running parameter may be the rotary speed; and for other types of devices, the device running parameters may be other running parameters. The expected running state may correspond to the target parameter value of the device running parameters of the target device.

After the target parameter value of the device running parameters of the target device is determined, the target parameter value may be carried in the device control instruction. That is to say, the device control instruction carrying the target parameter value is sent to the hardware controller through the first control task. The mode of sending the device control instruction to the hardware controller may be similar to that in the foregoing embodiments, and is not described herein again.

By means of this embodiment, the accuracy of device control may be improved by determining the parameter value of the device running parameters of the target device according to the sensor data, and carrying the determined parameter value in the device control instruction.

In an exemplary embodiment, the step of determining, by means of the first control task, the target parameter value of the device running parameter of the target device according to the sensor data of the specific sensor includes the following step.

At S41, when the target device is a fan, a target parameter value of a fan running parameter of the fan is determined by means of the first control task according to the sensor data of the specific sensor.

In this embodiment, the target device may be the fan, which may be configured to cool a server or other devices, that is, a cooling fan. In this case, the device running parameters may be the fan running parameters. There may be one or more fan running parameters; and the fan running parameters may include, but are not limited to, at least one of the following: a rotary speed, a rotary period, or period switching time, and may also be other running parameters. This embodiment is not limited thereto.

Correspondingly, determining, by the first control task, the target parameter value of the device running parameters of the target device according to the sensor data of the specific sensor may be to determine, by the first control task, the target parameter value of the fan running parameters of the fan according to the sensor data of the specific sensor. After the target parameter value is obtained, the first control task sends the device control instruction carrying the target parameter value to the hardware controller of the fan via the first bus, so as to control the running state of the fan.

By means of this embodiment, by controlling the running state of the fan, the running state of the fan may be rapidly controlled in scenarios such as the powering on of the system and the restarting of the system, so as to control the fan in time.

In an exemplary embodiment, the step of when the target device is the fan, determining, by means of the first control task, the target parameter value of the fan running parameter of the fan according to the sensor data of the specific sensor includes the following step.

At S51, when the target device is the fan and the specific sensor is a temperature sensor, a target rotary speed value of rotary speed of the fan is determined by the first control task according to sensor data of the temperature sensor, and the rotary speed of the fan is positively correlated with temperature measured by the temperature sensor.

For the scenario that the target device is the fan, the specific sensor may be the temperature sensor. There may be one or more temperature sensors. The arrangement position of the temperature sensor may be configured according to requirements. Different temperature sensors may be arranged on different positions. Optionally, the sensor data of the temperature sensor is configured to represent the temperature measured by the temperature sensor. For this, the first control task may determine the target rotary speed value of the rotary speed of the fan according to the sensor data of the temperature sensor. Herein, the rotary speed of the fan is positively correlated with the temperature measured by the temperature sensor.

When there are a plurality of temperature sensors, the highest temperature measured by the plurality of temperature sensors may be determined according to the sensor data of each temperature sensor. The rotary speed of the fan may be determined according to the highest temperature measured by the plurality of temperature sensors. The rotary speed of the fan is determined relative to an average temperature measured by the plurality of temperature sensors, such that the running safety of the devices may be guaranteed. For the scenario that there are a plurality of fans, the rotary speed of each fan may also be determined on the basis of the highest temperature or the average temperature measured by the temperature sensor matching each fan.

For example, the rotary speed of the fan may be controlled by using the first operating system (for example, RTOS) to replace processing units such as the CPLD, the EC chip and the custom chip (BMC fan control may be performed in real time). When the system is just powered on, the first processor core (for example, CPU0, the first processor core may be woken up by hardware) may be woken up. The first processor core runs the boot loader (for example, a specified program in the BootRom), so as to load the first operating system to start. The first processor core performs fan control (for example, fan speed control) by reading various sensor data related to the temperatures, to completely simulate the processing units, so as to complete the regulation functions of the fan. When fan speed control is performed, the first operating system may calculate a PWM value according to the temperature sensor, so as to adjust the rotary speed of the fan. In this way, the rotary speed of the fan may be controlled by the first operating system during the starting of the second operating system.

Exemplarily, the hardware of the fan controller is shown in FIG. 3. The multi-core processor includes CPU0 to CPUN. The multi-core processor normally runs service programs of the system. Because the Linux system runs more system service programs, the number of CPU cores initially allocated is higher; and the core that is initially allocated to the RTOS is CPU0, and the cores that are initially allocated to the Linux system are CPU1-CPUN. When the system is just powered on, the CPU0 is woken up, the CPU0 runs a specific program in BootRom, and the RTOS is loaded for starting. The CPU0 reads various sensor data related to temperature by means of an Inter-Integrated Circuit (IIC); the rotary speed of a brushed fan (or a brushless fan) is controlled by means of a brushed controller (or a brushless controller). A relationship among the first bus, the second bus and the IIC may be that the first bus may be a bus subordinate to the second bus, the IIC may be a bus subordinate to the first bus, and one bus subordinate to another bus may refer to the bus connected to the bus.

By means of this embodiment, by using the operating systems running on the processor cores to replace additionally added processing units for control of the fan rotary speed, the running costs of the system may be reduced while the control power of the fan is guaranteed.

In an exemplary embodiment, the step of booting the second operating system to start on the second processor core of the processor includes the following steps.

At S61, a Second Program Loader (SPL) is executed by the first processor core, so as to cause the SPL to wake up the second processor core.

At S62, a Universal Boot Loader (U-Boot) of the second operating system is run by the second processor core, so as to boot the second operating system to start on the first processor core.

In this embodiment, when the operating system is started, the SPL may be loaded in an internal memory, such as a Static Random-Access Memory (SRAM) in the SOC; and the SPL may be responsible for loading the U-Boot into an RAM. The SPL may boot and load the second operating system, and may also boot and load the first operating system.

The second operating system may execute the SPL through the first processor core, so as to cause the SPL to wake up the second processor core; and by means of the second processor core, the U-Boot of the second operating system may be run, so as to boot the second operating system to start on the first processor core. Herein, the boot loader of the second operating system is booted and loaded by the SPL; and the boot loader of the second operating system may include the U-Boot.

It is to be noted that, the SPL is codes executed at a first phase of the U-Boot, and may be responsible for carrying codes of a second phase of the U-Boot into a system RAM (which is also called an off-chip memory) for running. The U-Boot is open source software that follows a General Public License (GPL) protocol, and may be regarded as a comprehensive bare metal routine.

For example, after the system is powered on, the processor first wakes up the CPU0 core, so as to let the RTOS to run as fast as possible; then a program in the BootRom is used to boot the RTOS to start; and during the starting of the RTOS, the U-Boot is continuously loaded through the SPL, and the U-Boot boots the second operating system to start on the CPU1, until the Linux system is normally started.

It is to be noted that, the Boot Rom is an ROM solidification program in the chip (for example, the SOC), and is a boot code of the U-Boot. The Boot Rom reads start information (for example, dial switch settings) of hardware, and reads a uboot-spl code (that is, the SPL) from a specified start medium (for example, SD and MMC). The SPL is mainly responsible for initializing the external RAM and environment, and loading a real U-Boot image into the external RAM for execution. The external RAM may be a Double Data Rate (DDR) Synchronous Dynamic Random-Access Memory, or may be other RAMs.

By means of this embodiment, the second processor core is woken up by the SPL, and then the second processor core runs the U-Boot, such that the second operating system on the corresponding processor core is booted, thereby improving the convenience and success rate of the starting of the operating system.

As an optional example, a start process of the multi-core dual system is explained and described by using the RTOS and the Linux system as an example.

Figure 4:
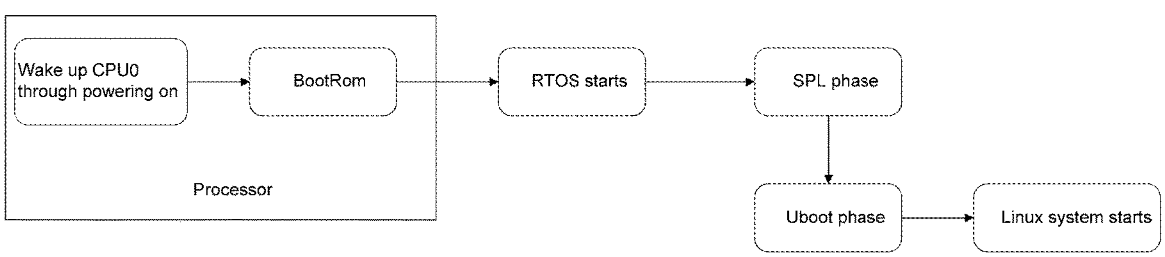
FIG. 4 is a schematic flowchart of an optional system power-on and start flow according to an embodiment of the present application.

In order to take over fan management as fast as possible, the RTOS may be started as much as possible; and after the starting of the Linux system is completed, the Linux system takes over the control power of the fan. In combination with FIG. 4, the start process of the multi-core dual system may include the following steps.

At S1, the CPU0 is woken up when the system is just powered on.

At S2, the CPU0 runs a specific program in BootRom, and the RTOS is loaded for starting.

At S3, during the starting of the RTOS, a CPU1 is woken up to boot the U-Boot, and a fan control program (FanCtrl_RTOS_APP) in the first operating system is started.

At S4, booting the U-Boot by the CPU1 may include an SPL phase and a U-Boot phase, and the SPL phase is entered by calling the SPL.

At S5, at the SPL phase, the SPL boots the U-Boot to start.

At S6, at the U-Boot phase, Linux cores (CPU1-CPUN) are loaded, and a BMC service program and a fan control program (FanCtrl_Linux_APP) in the second operating system are started.

By means of this optional example, during the starting and running of the dual system, the RTOS is first started to control the fan, and after the Linux system is started, the second operating system takes over the control power of the fan, such that the fan may be rapidly controlled when the system is powered on, thereby improving the efficiency of fan control.

In an exemplary embodiment, the step of taking over, by the second operating system, the hardware controller via the first bus includes the following steps.

At S71, a first inter-core interrupt is sent by means of the second operating system to the first operating system via the second bus, and the first inter-core interrupt is configured to request the second operating system to take over the hardware controller.

At S72, the hardware controller is controlled by means of a second control task of the second operating system via the first bus when a second inter-core interrupt that is returned by the first operating system in response to the first inter-core interrupt and is configured to indicate agreement to take over the hardware controller by the second operating system, and the second operating system is configured to control the hardware controller.

In this embodiment, the transferring of the control power of the target device among different operating systems may be completed by means of the inter-core interrupt, such as a Software Generated Interrupt (SGI, which is an inter-core interrupt of the Linux system). One operating system may send the inter-core interrupt to another operating system by means of an Inter-Processor Interrupt (IPI), so as to request to take over the hardware controller of the target device, thereby acquiring the control power of the target device. Herein, differing from a common external interrupt, the IPI is an interrupt that is triggered among the plurality of cores in the SOC. Part of interrupt numbers in the cores are particularly reserved for the IPI. For example, in an ARM64 architecture, the reserved interrupt numbers are 16 interrupt numbers of 0-15.

For the second operating system, when the second operating system needs to take over the hardware controller of the target device, the first inter-core interrupt may be sent to the first operating system, so as to request the second operating system to take over the hardware controller. The first inter-core interrupt may be sent via the second bus. After the first operating system receives the first inter-core interrupt, whether the second operating system is currently allowed to take over the hardware controller may be determined; if so, the second inter-core interrupt may be returned to the second operating system, and the second inter-core interrupt is configured to indicate agreement to take over the hardware controller by the second operating system.

After the second inter-core interrupt is received, the second operating system may control the hardware controller by means of the second control task; the second control task is configured to control the hardware controller; and the control of the second control task to the hardware controller may be completed via the first bus. The second control task may be created before the first inter-core interrupt is sent, or may be created after the second inter-core interrupt is received, and this embodiment is not limited thereto.

For example, after the Linux system is started, the CPU1 starts sending the IPI to the CPU0, so as to request to acquire the control power of the fan.

By means of this embodiment, the reliability of device control may be improved by using the inter-core interrupt to complete the transferring of the control power of the target device among different operating systems.

In an exemplary embodiment, after the first inter-core interrupt is sent to the first operating system by means of the second operating system via the second bus, the method further includes the following steps.

At S81, in response to the acquired first inter-core interrupt, a third control task of the first operating system is controlled to hibernate, and the third control task is configured to control the hardware controller.

At S82, when the third control task has been hibernated, the second inter-core interrupt is sent by the first operating system to the second operating system via the second bus.

In this embodiment, for the first operating system, the task of the first operating system for controlling the hardware controller of the target device may be a third control task, or may be the foregoing first control task, and the logic for controlling the hardware controller is similar to that in the foregoing embodiments. After the first inter-core interrupt is acquired, the first operating system may control the third control task to hibernate, so as to avoid a situation where both operating systems have a control task controlling the hardware controller, resulting in a chaotic device control.

After the third control task has been hibernated (that is, the third control task is in a hibernation state), the first operating system may send the second inter-core interrupt to the second operating system; and the second inter-core interrupt may be sent via the second bus.

For example, the RTOS receives the IPI sent by the CPU1, and then starts to hibernate the associated services on the RTOS one after the other. When the associated services on the RTOS are completely hibernated, the CPU0 sends the IPI to the CPU1, so as to notify the CPU1 that the CPU1 may acquire the control power of the fan.

By means of this embodiment, on the basis of the received inter-core interrupt, the corresponding control tasks may be hibernated, and device control power is then transferred by means of the inter-core interrupt after the corresponding control tasks are hibernated, such that the reliability of device control may be improved.

In an exemplary embodiment, the method further includes the following step.

At S91, when the third control task has been hibernated, system running data of the first operating system is pushed into a stack, and the second inter-core interrupt is further configured to instruct the second operating system to take over the first processor core.

In this embodiment, when the second operating system cannot control the running state of the target device, the first operating system temporarily controls the running state of the target device. In this case, the tasks running in the first operating system are all tasks related to control of the running state of the target device, for example, the third control task. If the second operating system has been able to control the running state of the target device, if the third control task has been hibernated, there may be no task process running in the first operating system, such that the first processor core is not effectively utilized.

For example, during the starting of the Linux system, the control power of the fan is in the RTOS. After the Linux is normally started, the control power of the fan is taken over from the RTOS. In this case, there is no task process running on the RTOS, and the resources of the CPU0 core are not effectively utilized.

In this embodiment, a resource recycling mechanism of the processor core (for example, the CPU0 core) of the first operating system may be used. When the third control task has been hibernated, a site of the first operating system may be saved, that is, system running data of the first operating system is pushed into the stack. In addition, the second operating system may be indicated by the second inter-core interrupt to take over the first processor core.

For example, the resource recycling mechanism of the CPU0 core may be used. After the Linux system is completely started (on CPU1 . . . . CPUN), the RTOS hands the control power of the fan over the Linux system for control, the CPU0 core is released and scheduled for the Linux system; CPU0 puts the RTOS to sleep, release all the current services, push the running data into the stack, and add itself to a queue wherein the Linux system runs, so as to allow the Linux system to schedule the resources, such that the purpose of improving the resource utilization rate of the CPU cores is achieved. For the Linux system, after the Linux system takes over the control power of the fan, the RTOS may go into sleep, the CPU0 core is released, and the CPU0 core is recycled, such that the Linux system may normally schedule the CPU0 core. Therefore, all CPU core service for the Linux system, thereby saving the resources, and improving the resource utilization rate of the CPU cores.

By means of this embodiment, the resource recycling mechanism of the processor core is used; and after the second operating system takes over the control power of the target device, the data of the first operating system running on the processor core of the first operating system is pushed into the stack, and the processor core of the first operating system is released to the second operating system, such that the resource utilization rate of the processor cores may be improved.

As an optional example, a process of interacting the control power of the fan by means of the inter-core interrupt is explained and described by using the RTOS and the Linux system as an example.

Figure 5:
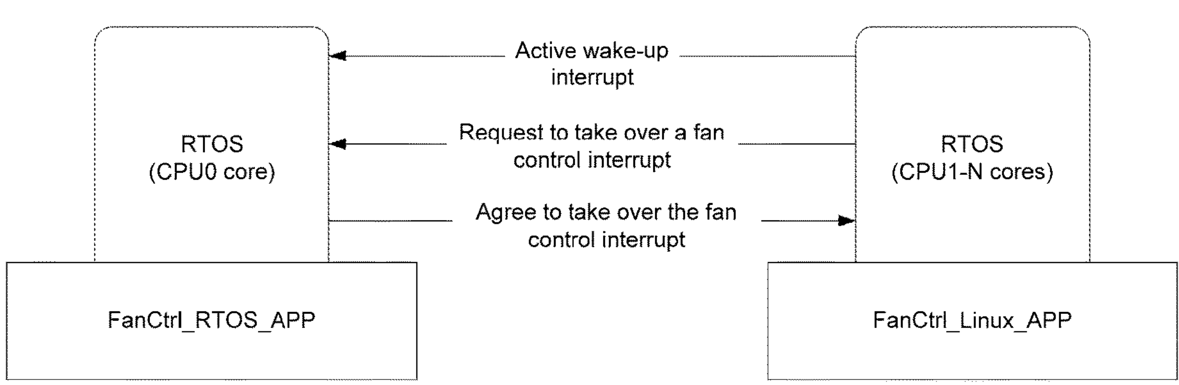
FIG. 5 is a schematic diagram of an optional inter-core interrupt according to an embodiment of the present application.

As shown in FIG. 5, after the Linux system triggers the interrupt for requesting to take over fan control, a FanCtrl_RTOS_APP process completes the tasks being processed, and the RTOS pushes the system running data into the stack and returns the interrupt that agrees to take over fan control. The Linux system takes over the CPU0 core, and allocates, according to a scheduling balance algorithm, the FanCtrl_Linux_APP process to the CPU0 core or the CPU cores of other Linux systems for running.

By means of this optional example, the convenience of information interaction may be improved by interacting the control power of the fan by means of the inter-core interrupt, and the reliability of device control is improved.

In an exemplary embodiment, after the hardware controller is taken over by the second operating system via the first bus, the method further includes the following steps.

At S101, when the second operating system waits for restart, the first operating system is woken up by the second operating system via the second bus, and the hardware controller is taken over by the first operating system via the first bus, so as to take over the control power of the target device.

At S102, the second operating system is controlled to perform system restart.

In this embodiment, when restarting is required due to reasons such as system breakdown and receiving of a reboot command, the second operating system may first wake up the first operating system, and the hardware controller is taken over by the first operating system, so as to take over the control power of the target device. The waking up of the first operating system may be executed by the second bus, and the takeover of the hardware controller by the first operating system may be executed via the first bus.

By means of this embodiment, when the second operating system is restarted, the first operating system is woken up to take over the control power of the target device, such that the reliability of device control may be improved.

In an exemplary embodiment, the step of when the second operating system waits for restart, waking up the first operating system by the second operating system via the second bus includes the following step.

At S111, when the second operating system waits for restart, a system wake-up interrupt is initiated to the first operating system by the second operating system via the second bus, and the system wake-up interrupt is configured to wake up the first operating system.

In this embodiment, the waking up of the first operating system may be implemented by means of inter-core interruption. If the second operating system is to be restarted (for example, system breakdown and receiving of the reboot command), the second operating system may send the system wake-up interrupt to the first operating system, so as to wake up the first operating system. The system wake-up interrupt may be an active wake-up interrupt. After the first operating system takes over the hardware controller, the second operating system may be controlled to perform system restarting; and after the second operating system is restarted, the hardware controller may be taken over again. The process of taking over the hardware controller is similar to that in the foregoing embodiments, and is not described herein again.

Figure 6:
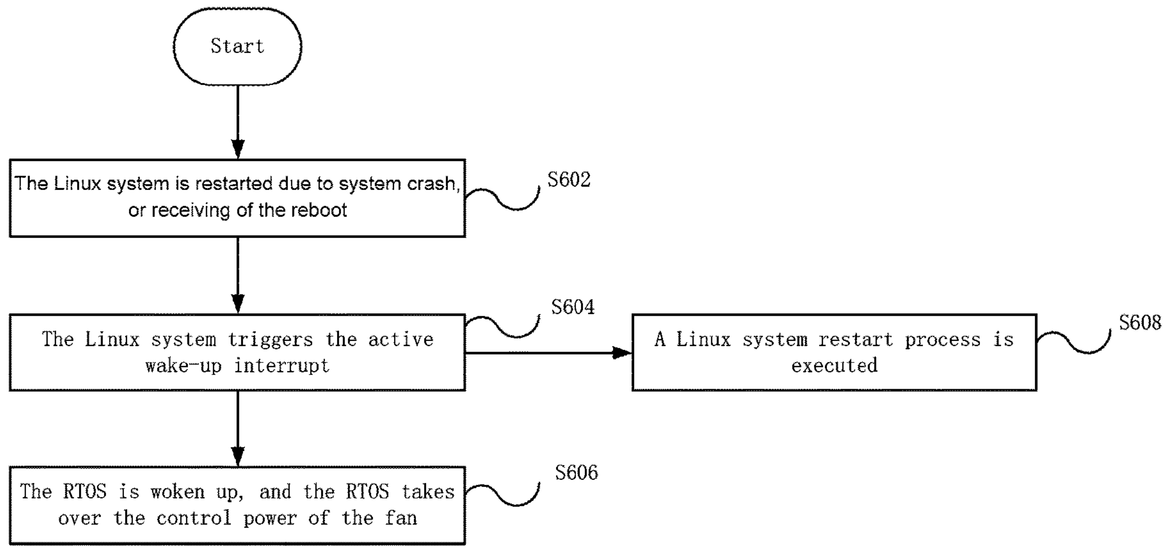
FIG. 6 is a schematic flowchart of another optional embedded system start control method according to an embodiment of the present application.

For example, as shown in FIG. 6, in a fan control workflow, when the Linux system is restarted (crash or reboot command), an active wake-up interrupt is initiated; and after the Linux system is restarted, the flow of fan control may include the following steps.

At S602, the Linux system is restarted due to system crash, or receiving of the reboot command.

At S604, the Linux system triggers the active wake-up interrupt.

At S606, the RTOS is woken up, and the RTOS takes over the control power of the fan.

At S608, a Linux system restart process is executed.

By means of this embodiment, the operating system is actively woken up by means of the inter-core interrupt, such that the wake-up convenience and reliability of the operating systems may be improved.

The embedded system start control method in this embodiment of the present application is explained and described below in combination with optional examples. In this optional example, the first operating system is the RTOS, the second operating system is the Linux system, and the target device is the fan.

Figure 7:
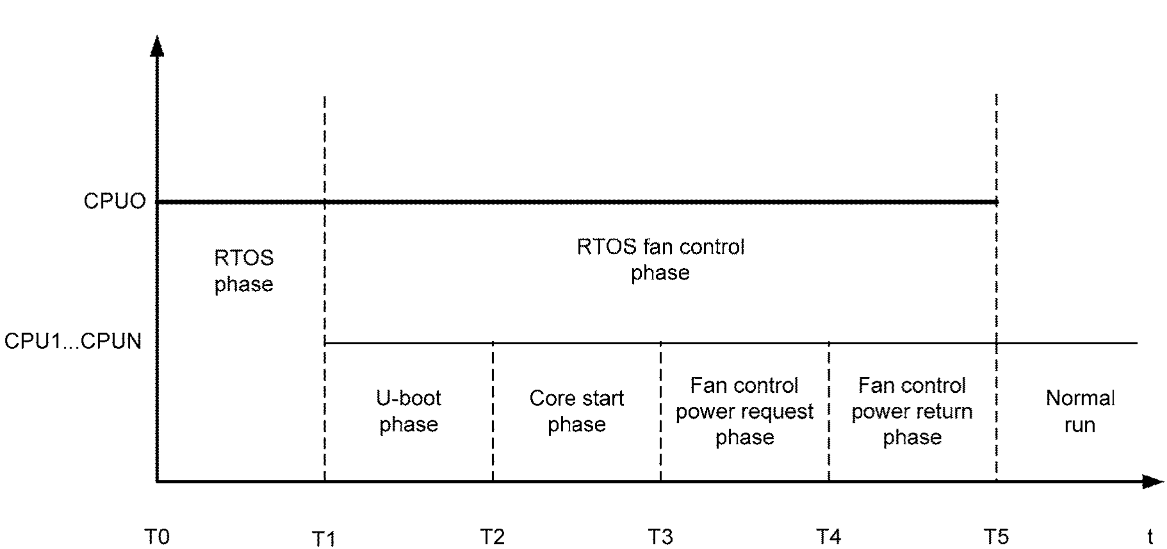
FIG. 7 is a schematic diagram of an optional embedded system start control method according to an embodiment of the present application.

This optional example provides a solution for real-time fan control in a multi-core dual system. As shown in FIG. 7, the flow of the embedded system start control method in this optional example may include the following steps.

At S1, at T0-T1 phases, the system starts to be powered up, the CPU0 is woken up by hardware, partial codes of the RTOS start to be executed, and at the same time, the CPU1 is woken up, and the CPU1 is allowed to participate in a start process of the U-boot.

At S2, starting at T1, the woken-up CPU starts executing the codes of the U-boot, to initialize data related to part of the hardware, so as to boot the Linux operating system to start. In addition, the task related to fan control on the RTOS on the CPU0 continues to run until T5.

At S3, starting at T2, the Linux operating system starts to start.

At S4, the starting of the Linux system is completed at T3, the CPU1 starts to send the IPI to the CPU0, to request to acquire the control power of the fan and make the CPU0 stop the services related to the RTOS, so as to run service codes related to the Linux system.

At S5, starting at T4, the RTOS receives the IPI sent by the CPU1, and then starts to hibernate the associated services on the RTOS one after the other. When the associated services on the RTOS are completely hibernated, the CPU0 sends the IPI to the CPU1, so as to notify the CPU1 that the CPU1 may acquire the control power of the fan and the CPU0 may participate in service running of the Linux system side.

Starting at T5, the CPU0 is recycled to the Linux system side, and the entire system is changed to a running mode of a multi-core single system, so as to normally run the subsequent all codes.

By means of this optional example, by reusing a CPU core to replace the hardware to control the fan, the resource utilization rate of the CPU cores is improved; and at the same time, extra costs do not need to be added, and in addition, good extendibility is achieved.

In an exemplary embodiment, the operation services and processing resources may be, but are not limited to, allocated for each operating system by using the following manners.

A group of services to be allocated are allocated to the corresponding operating systems in the embedded system according to a dynamic resource allocation rule. The dynamic resource allocation rule includes performing dynamic resource allocation according to at least one of the following: the service response speed, the service resource occupation rate, the service coupling degree, and the service importance. The embedded system includes the first operating system and the second operating system.

Resource allocation results corresponding to the group of services to be allocated is determined. The resource allocation result is configured to indicate the processing resource corresponding to each service to be allocated in the group of services to be allocated in the processing resources of the processor. The processing resources of the processor include processor cores.

The processing resources of the processor are allocated to the first operating system and the second operating system according to the operating system corresponding to each service to be allocated and the resource allocation result.

During the running of the processor, the group of services to be allocated may be acquired, that is, the services to be allocated to the first operating system and the second operating system. Since different services to be allocated may differ in dimensions such as the response speed, the service resource occupation rate, the service coupling degree with other services, and service importance, the dynamic resource allocation rule may be configured in advance. The dynamic resource allocation rule may include rules used for performing service allocation. The services are allocated to the corresponding operating systems, so as to cause the processing resources of the corresponding operating systems to execute the services allocated to themselves. Optionally, the dynamic resource allocation rule may include performing dynamic resource allocation according to at least one of the following: the service response speed, the service resource occupation rate, the service coupling degree, and the service importance. Different allocation rules may have corresponding priority levels. For example, the priority levels are the service importance, the service coupling degree, the service response speed, and the service resource occupation rate according to a sequence from high to low. According to the dynamic resource allocation rule, the group of services to be allocated (or tasks to be allocated, different services to be allocated may correspond to different processes) may be allocated to the corresponding operating systems in the embedded system, so as to obtain a service allocation result.

Optionally, on the basis of constraints on response time, the first operating system may be an operating system that has a clear fixed time constraint. All processing processes (task scheduling) need to be completed within the fixed time constraint, otherwise, the system makes an error. The first operating system may be the RTOS, such as FreeRTOS and RTLinux, or may be the RTOS in other embedded systems. The second operating system does not have the characteristic. The second operating system generally uses a fair task scheduling algorithm. When the number of threads/processes is increased, CPU time needs to be shared. Task scheduling is uncertain, and may be called the non-RTOS, such as contiki, HeliOS, and Linux, or may be the non-RTOS in other embedded systems.

Correspondingly, the service allocated to the first operating system is generally a real-time service. The real-time service refers to a service that needs to be scheduled within a specified time. The service needs to be processed by the processor at a fast enough speed, and a processed result can also control a production process with in the specified time or make a rapid response on the processing system. As a typical scenario, the control of robotic manipulators in industrial control belongs to the real-time service; and the system needs to take measures in time before misoperation of the robotic manipulators is detected, otherwise serious consequences may be caused. The service allocated to the second operating system generally is a non-real-time service. The non-real-time service refers to a service that is insensitive to a scheduling time, and has certain tolerance for scheduling delays, for example, sensor data of a temperature sensor is read in the server.

It is to be noted that, the RTOS refers to the operating system that can receive and process with the fast enough speed when an external event or data is generated, has the processed result that can control the production process within the specified time or make a rapid response on the processing system, completes real-time services by scheduling all available resources, and controls all the real-time services to run in a harmonized manner, and has the characteristics of timely response and high reliability.

Figure 8:
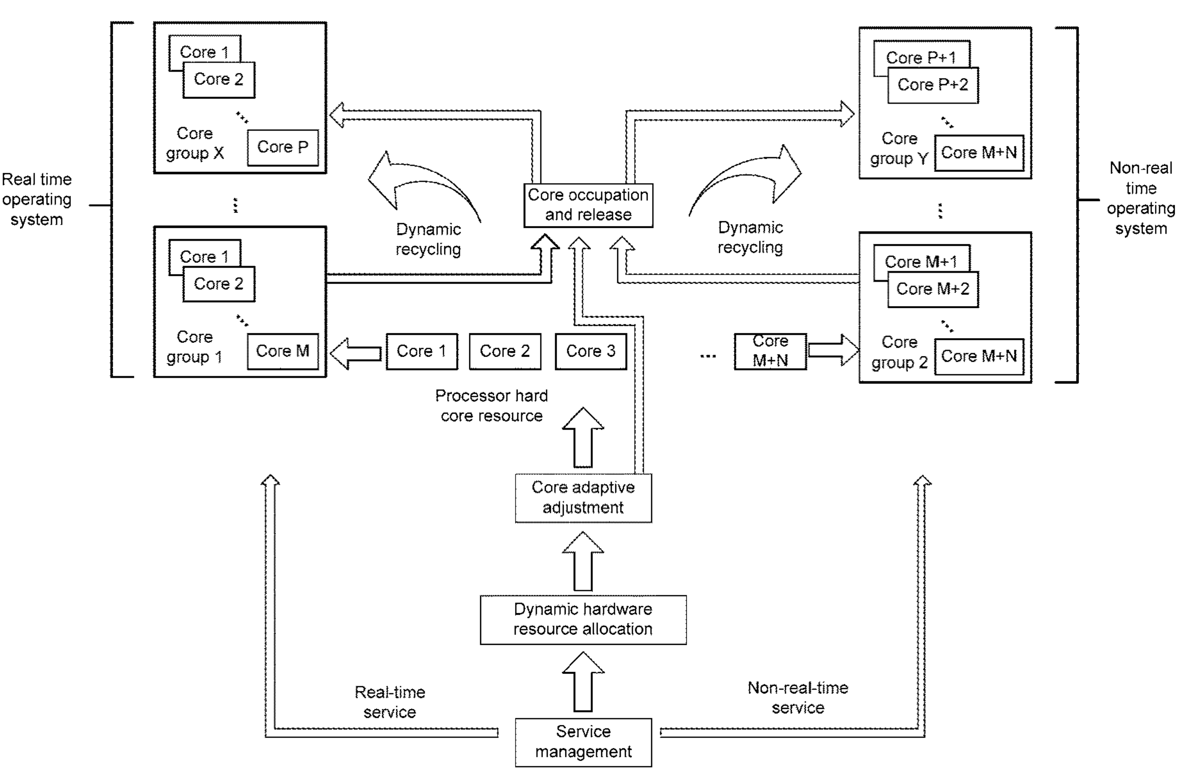
FIG. 8 is a schematic diagram of another optional embedded system start control method according to an embodiment of the present application.

Optionally, allocation of the group of services to be allocated to the corresponding operating systems may be executed by a service management module. As shown in FIG. 8, the service management module may be a software module that runs on the first operating system or the second operating system. For example, the service management module run on the second operating system, the service management module may be implemented by the software in the Linux system. The service management module may allocate the group of services to be allocated to the corresponding operating systems in the embedded system according to the dynamic resource allocation rule.

After each service to be allocated is allocated to the corresponding operating system, according to the service allocation result, corresponding processing resources may be allocated for each service to be allocated, so as to obtain resource allocation results corresponding to the group of services to be allocated. When the processing resources are allocated for the services to be allocated, the processing resources of the first operating system may be allocated to the services that are allocated to the first operating system, and the processing resources of the second operating system are allocated to the service that are allocated to the second operating system. In addition, considering load balancing, when there are unallocated processing resources, the unallocated processing resources may be allocated for part of the services.

The processing resources of the processor may be dynamically allocated in units of time slices. Considering the frequent switching of the operating systems to which the processing resources belong and the fact that the service processing time is not necessarily an integer multiple of the time slice, resulting in prolonged response time of some services, processing resources may be allocated to the first operating system and the second operating system in units of processor cores, that is, the processor cores of the processor are allocated to the corresponding operating systems in units of the entire processor core. The number of the processor cores allocated for each operating system is an integer, and different operating systems are allocated with different processor cores.

Optionally, determining the resource allocation results corresponding to the group of services to be allocated may be executed by a dynamic resource allocation module. As shown in FIG. 8, the dynamic resource allocation module may be a software module that runs on the first operating system or the second operating system. For example, the dynamic resource allocation module run on the second operating system, the dynamic resource allocation module may be implemented by the software module in the second operating system, and may dynamically allocate the processing resources for the services according to the output of the service management module. Herein, the software module may be a program module with a preset function. For example, the dynamic resource allocation module may be a program module with a dynamic resource allocation function; and the service management module may be a program module with a service management function; and each software module may be deployed and adjusted as a whole, and at the same time, may be applied to applications in different application projects.

The processing resources of the processor may be allocated to the first operating system and the second operating system according to the operating system corresponding to each service to be allocated and the resource allocation result. Optionally, the unallocated processing resources of the processor may be allocated to the operating systems corresponding to the processing resources. The unallocated processing resources may be determined on the basis of the correspondence relationship between the unallocated processing resources and the services to be allocated and the correspondence relationship between the services to be allocated and the operating systems.

Optionally, as shown in FIG. 8, the allocation of the processing resources of the processor to the first operating system and the second operating system may be executed by a resource adaptive scheduling module (for example, a core adaptive scheduling module). The resource adaptive scheduling module may be a software module running on the first operating system or the second operating system. By running on the second operating system as an example, the resource adaptive scheduling module may be implemented by software in the Linux system, and may complete an actual scheduling action on the processing resources of the processor (for example, processor hard core resources) according to the output of a service management module and the output of a dynamic resource allocation module. For example, through resource scheduling of a core resource adaptive module, M of (M+N) cores are scheduled to the RTOS, and N cores are scheduled to the non-RTOS.

For example, heterogeneous operating systems may run on different hard cores of the same processor, so as to cause the entire processor to have parallel processing capabilities of real-time and non-real-time services. In addition, the resource utilization rate of the processor is significantly improved by adaptively adjusting processor hard core resources (for example, processor cores) that are occupied by different operating systems. Herein, heterogeneity means that the operating systems running in the same multi-core processor of the embedded system are different in type; and the multi-system means that there are a plurality of operating systems running on the same multi-core processor of the embedded system, and these operating systems run at the same time in a time dimension.

Optionally, the above process further includes: configuring a file through a reading rule, so as to generate a rule structure body, where the rule structure body is configured to record the dynamic resource allocation rule.

The dynamic resource allocation rule may be configured on the basis of a rule configuration file; and through the read rule configuration file, the rule structure body configured to record the dynamic resource allocation rule may be generated. Herein, the rule configuration file may be a load balancing policy file (payload_balance.config). The load balancing policy file may be configured to configure methods for classifying various services (or processes) running, the principles of evaluating real-time levels, etc. In the load balancing policy file, the dynamic resource allocation rule may be configured with different parameters. One example of the load balancing policy file is shown below.

If the value of classification kinds=2// is 1, it indicates that the processes are classified according to attributes such as critical and non-critical, otherwise the processes are classified according to a preset classification method (for example, real-time and non-real-time).

If the value of real-time grade evaluation=2// is 1, it indicates that an average occupation rate of the CPUs within past statistic minutes is used as the principle of evaluating the real-time levels of the processes; otherwise, it indicates that a preset priority level is used as the principle of evaluating the real-time levels of the processes.

statistic minutes=5// represents statistical time (in minute) of the average occupation rate of the processes; and it is valid when real-time grade evaluation is 1.

Optionally, the dynamic resource allocation rule may be stored in a load balancing policy module. Herein, the load balancing policy module may be a software module (for example, a software module running under the Linux system) running under the first operating system or the second operating system, and may provide strategic guidance for the service management module, including the methods for classifying various services (or processes) running in the system, the principles of evaluating real-time levels, etc. The service management module may perform service division and management on the services in the system according to the real-time levels, and may further guide the resource adaptive scheduling module to re-allocate the processor resources. Exemplarily, actual classification of the services may be executed according to the output of the load balancing policy module, so as to generate a list including real-time services and non-real-time services.

It is to be noted that, the above classification method and the principles of evaluating real-time levels are open, such that the user may define a certain method or principle himself. The rules on which the service management module performs service management is based may be dynamically configured, and settings on rules may be further performed on the basis of existing rules. A plurality of rules having the same function may be set in the service management module, but there is no contradiction between the rules, that is, the currently used rule in the rules having the same function may be determined on the basis of rule selection conditions such as configuration time of the rules and the priority levels of the rules, so as to avoid contradiction between the rules. The above configuration file load_balance.config describes a possible scenario. In the configuration file, the variable classification_kinds indicates a specific classification standard (for example, according to the importance or real-time natures of the services) and a classification category (for example, important services and general services, real-time services and non-real-time services); the variable real-time_grade_evaluation indicates a real-time evaluation standard (which may be according to the average occupation rate of the CPUs within the past statistic_minutes or the preset service priority level); and the type of the real-time levels is defined by the user, may be defined as high, normal or low, or may be subdivided into more types.

The output of the load balancing policy module is the well-configured classification methods and the principles of evaluating real-time levels, and may be the specific configuration files (for example, the load_balance.config file) or structure body variables during software implementation. These files or structure body variable can finally be accessed by the service management module, so as to acquire specific policies for load balancing.

By means of this embodiment, the convenience of information configuration may be improved by reading the rule configuration file, and generating the rule structure body, so as to record the dynamic resource allocation rule.

Optionally, the above process further includes: acquiring a rule update configuration file by an external interface of the second operating system, where the rule update configuration file is configured to update the dynamic resource allocation rule that has been configured; and using the rule update configuration file to update the rule structure body, so as to update the dynamic resource allocation rule recorded by the rule structure body.

The rule structure body may be in a fixed format, that is, modification is not allowed during the running of the embedded system; or the rule structure body may be in a format that may be flexibly configured, that is, configuration changing may be performed by the configuration file in a specific format. In this embodiment, the rule update configuration file may be acquired. The rule update configuration file is configured to update the dynamic resource allocation rule that has been configured; and using the rule update configuration file may update the rule structure body, so as to update the dynamic resource allocation rule recorded by the rule structure body.

When the rule structure body is updated by using the rule update configuration file, a new rule structure body may be directly generated according to the rule update configuration file, and the newly-generated rule structure body is used to replace the existing rule structure body; alternatively, parameter values of rule parameters corresponding to the rule structure body may be updated by using parameter values of rule parameters indicated by the rule update configuration file.

Optionally, the configuration file in the specific format may be read by the external interface of the first operating system or the second operating system. Considering a service magnitude required to be processed, the second operating system is mainly responsible for dynamic resource scheduling of the embedded system. When the rule update configuration file is acquired, the rule update configuration file may be acquired by the external interface of the second operating system.

For example, the load balancing policy module may be in a fixed format, or may be configured by the external interface of the Linux system, for example, the configuration file (load_balance.config) in the specific format may be defined, and configuration changing is performed by means of file reading and writing.

It is to be noted that, the external interface is an external interface of the multi-core processor, and may be a network interface, a Serial Peripheral Interface (SPI) controller interface, or a UART serial port, as long as the passage of the data can be acquired externally. There are different implementation solutions for hardware and specific file positions used for file reading. For example, the configuration file may be loaded from an interface of a World Wide Web (Web) through the network interface; the configuration file may be read from a SPI Flash of a board card through the SPI controller; and the configuration file may be acquired from a serial port data transmission and receiving software tool on another Personal Computer (PC) through the UART serial port.

By means of this embodiment, the configuration flexibility of the dynamic resource allocation rule may be improved by acquiring the rule update configuration file and using the acquired rule update configuration file to update the rule structure body.

Optionally, the group of services to be allocated may be, but are not limited to, allocated to the corresponding operating systems in the embedded system according to the dynamic resource allocation rule by using the following manners: allocating, to the first operating system, services to be allocated of which service response speed in the group of services to be allocated is required to be greater than or equal to a set response speed threshold, and allocating, to the second operating system, services to be allocated of which the service response speed in the group of services to be allocated is required to be less than the set response speed threshold.

When the services to be allocated are allocated, the services to be allocated may be required to be allocated to the corresponding operating systems on the basis of the service response speed of the services to be allocated. The service response speed may be configured to evaluate the real-time levels of the services. If the requirement for the service response speed is higher, the services are more sensitive to the scheduling time and response speed of the operating systems, and the real-time levels are higher. The services with high requirements for the service response speed needs the operating system to process with a fast enough speed, and the processed result can also control a production process with in the specified time or make a rapid response on the processing system; and the services with low requirements for the service response speed have certain tolerance for scheduling delays.

The services to be allocated of which service response speed is required to be greater than or equal to the set response speed threshold are sensitive to the scheduling time and response speed of the operating systems, such that such services to be allocated may be allocated to the first operating system (for example, the real-time services are allocated to the RTOS). The services to be allocated of which service response speed is required to be less than the set response speed threshold are services that are not sensitive to the scheduling time and response speed, such that such services to be allocated may be allocated to the second operating system (for example, the non-real-time services are allocated to the non-RTOS). Herein, the requirement for the service response speed may be indicated by an indication parameter of the service response speed. The set response speed threshold may be a millisecond-level response speed threshold or a second-level response speed threshold, such as 100 ms, 200 ms, 1 s, etc. the set response speed threshold is not limited in this embodiment.

Optionally, when the group of services to be allocated are allocated to the corresponding operating systems in the embedded system, a first service list corresponding to the first operating system and a second service list corresponding to the second operating system may be outputted. The first service list is configured to record the services that are allocated to the first operating system; and the second service list is configured to record the services that are allocated to the second operating system. That is to say, the service allocation result includes the first service list and the second service list, and the outputted first service list and second service list may be configured to perform the dynamic scheduling process of the processing resources of the processor.

For example, the real-time levels of the services of the system are divided, so as to obtain real-time service and non-real-time service lists. Assuming that there are 20 services in total, the real-time services are Service 1 and Service 2, and the non-real-time services are Service 3 to Service 20.

Herein, the service management module may classify the current services to be executed. When a BMC system runs for the first time, since all the services that are about to be run currently by the system are known to the system, the service management module performs one-time classification on these services according to the output of the load balancing module. After classification, different services are allocated to different operating systems (the RTOS and the Linux system) for execution. In the subsequent running process, if the number of the service processes is changed (for example, some processes are hung up, or there are new processes started), the service management module continues to perform service division, so as to divide and manage the existing services in real time according to a load balancing policy. The service management module may be a resident process in the Linux system; and the service management module is always running, and manages and divides the current running processes.

By means of this embodiment, the timeliness of service response of the services sensitive to the scheduling time may be guaranteed by allocating the services to be allocated to the corresponding operating systems according to the requirement for the service response speed.

Optionally, the group of services to be allocated may be, but are not limited to, allocated to the corresponding operating systems in the embedded system according to the dynamic resource allocation rule by using the following manners: allocating, to the first operating system, the services to be allocated of which service resource occupation rate in the group of services to be allocated is less than a first occupation rate threshold, and allocating, to the second operating system, the services to be allocated of which service resource occupation rate in the group of services to be allocated is greater than or equal to the first occupation rate threshold.

When the services to be allocated are allocated, the services to be allocated may be allocated to the corresponding operating systems on the basis of the service resource occupation rate of the services to be allocated. The service resource occupation rate may be an average proportion (for example, a CPU occupation rate of every minute) of the services per unit of time for the processing resources. The level of the service resource occupation rate affects the response speed of the current service and the response speed of the subsequent services. Therefore, the real-time levels of the services may be evaluated on the basis of the service resource occupation rate. If the service resource occupation rate is higher, the impact of the services on the scheduling time and response speed of the operating systems is larger, and the real-time levels are lower; and for the services of which service resource occupation rate is not high, the impact of the services on the scheduling time and response speed of the operating systems is not large, and the real-time levels are higher.

For the services to be allocated of which service resource occupation rate is less than the first occupation rate threshold, the impact of the services on the scheduling time and response speed of the operating systems is not large, such that such services to be allocated may be allocated to the first operating system. For the services to be allocated of which service resource occupation rate is greater than or equal to the first occupation rate threshold, the impact of the services on the scheduling time and response speed of the operating systems is large, such that such services to be allocated may be allocated to the second operating system. Herein, the first occupation rate threshold may be configured according to needs, which may be 10%, 15%, 20% or other thresholds. In addition, the first occupation rate threshold may be dynamically adjusted.

By means of this embodiment, the timeliness of service response of the services with low service resource occupation rate may be guaranteed by allocating the services to be allocated to the corresponding operating systems according to the service resource occupation rate.

Optionally, the group of services to be allocated may be, but are not limited to, allocated to the corresponding operating systems in the embedded system according to the dynamic resource allocation rule by using at least one of the following manners.

Services to be allocated in the group of services to be allocated that have a service coupling degree with the allocated services of the first operating system being greater than or equal to a first coupling degree threshold are allocated to the first operating system.

The services to be allocated in the group of services to be allocated that have a service coupling degree with the allocated services of the second operating system being greater than or equal to a second coupling degree threshold are allocated to the second operating system.

When the services to be allocated are allocated, the services to be allocated may be allocated to the corresponding operating systems on the basis of the service coupling degree of the services to be allocated. The service coupling degree may be configured to indicate an association degree between the services to be allocated and the allocated services in each operating system. If one service to be allocated has a higher second coupling degree with the allocated service in the operating system, the service is not suitable for being allocated to another operating system. Therefore, the services to be allocated may be allocated to the corresponding operating systems on the basis of the service coupling degree between the services to be allocated and the allocated services in each operating system.

Optionally, the service coupling degree may be evaluated through the association between the input and the output of the services. The service coupling degree may be represented by different coupling degree levels. If there is no relationship between the input and the output of the services, the coupling degree level is low (or other coupling degree levels that indicate no association between the services); if the execution of one service depends on the output of another application (the service cannot be started if there is no such output as the input), the coupling degree level between the services is high; and if the execution of one service uses the output of another application, but the output does not prevent the normal execution of the service (the output can be acquired when the service is executed to the corresponding operation, and the corresponding operation is not a core operation), the coupling degree level between the services is medium. In addition, the service coupling degree may also be represented by using values. The service coupling degree may be evaluated through one or more coupling degree conditions (for example, the association relationship between the input and the output); and then the value corresponding to the met coupling degree condition is determined as the value of the service coupling degree.

If there are services to be allocated in the group of services to be allocated that have the service coupling degree with the allocated services of the first operating system being greater than or equal to the first coupling degree threshold, such services to be allocated may be allocated to the first operating system; and if there are services to be allocated in the group of services to be allocated that have the service coupling degree with the allocated services of the second operating system being greater than or equal to the first coupling degree threshold, such services to be allocated may be allocated to the second operating system.

For example, in addition to generating the real-time service list and the non-real-time service list, the service management module is also responsible for service decoupling evaluation and management, that is, the services that may be separated out to hand over to the RTOS for running are found from all the real-time services, so as to allow the hardware dynamic resource allocation module to perform re-allocation of the processor resources; and for the services that cannot be separated out to hand over to the RTOS for running, if the services have a high service coupling degree with the non-real-time services, the services may be allocated to the non-RTOS.

Herein, although some services have real-time requirements, the services frequently interact with other non-real-time services in the system (that is, the service coupling degree is high). In this case, in order to improve overall data interaction efficiency, such services are allocated to the non-RTOS. There is another type of real-time services that are relatively independent, and in this case, the services are divided to the RTOS. The process is a "decoupling" operation. There is no single criterion for determining the independence of the services, it may be the closeness of the association between the services or indicators that are concerned by other users.

The policy of re-allocation is open. One possible policy includes: when the system runs for the first time, allocating the processor cores according to the ratio of the number of services that are allocated to the RTOS and the non-RTOS by the service management module, and in the subsequent process, adjusting resource allocation according to the respective core resource occupation rates in the dual system. From this point of view, the re-allocation process and the core occupation and releasing process are processes that cooperate with each other.

By means of this embodiment, the accuracy of service processing for the plurality of services with high service coupling degrees may be guaranteed by allocating the services to be allocated to the corresponding operating systems according to the service coupling degrees.

Optionally, the group of services to be allocated may be, but are not limited to, allocated to the corresponding operating systems in the embedded system according to the dynamic resource allocation rule by using the following manners.

The services to be allocated in the group of services to be allocated that include sensitive information are allocated to a target operating system. The target operating system is an operating system in the first operating system and the second operating system that has a low frequency of interaction with a use object.

In this embodiment, for the services to be allocated (which may be important and sensitive services, for example, services that do not want to be exposed to the users) including sensitive data (for example, sensitive information such as passwords), the services may be allocated to the target operating system; and then hard core level security isolation is performed on the services to be allocated including the sensitive information by the target operating system. Herein, the target operating system is an operating system in the first operating system and the second operating system that has a low frequency of interaction with a use object, or an operating system with a fast response speed, for example, the first operating system.

For example, a service processing module is responsible for further performing hard core level security isolation on system services, that is the important and sensitive services (which do not want to be exposed to the users) are classified as the real-time services; and finally, the services are unloaded from the non-RTOS to the RTOS, so as to achieve the effect of security protection. Herein, the service processing module divides different services, and organization may be performed by using the form of structure bodies during software implementation. By designing a safe space between the heterogeneous operating systems, the sensitive services are unloaded from the non-RTOS to the RTOS, so as to achieve the purpose of hard core level security protection. Herein, the sensitive services refer to the services related to security, for example, the services involving user privacy such as user passwords and identity information.

Herein, a hard core level means that isolation is performed on the services at a processor core level, that is, the sensitive services are allocated to the RTOS (the cores occupied by the RTOS are different from that occupied by the non-RTOS, belonging to the isolation at a core level). Compared with the non-RTOS, the RTOS is relatively weak in frequency and degree of interaction with the users, such that it is hard for the users to "detect" the sensitive data generated by the services running thereon. For the upper-layer application, services such as identity management of the users and security encryption belong to the important sensitive services. The services are forcibly classified as the real-time services by the service management module, such that the services can run on the RTOS when hardware dynamic resource allocation is performed subsequently, so as to achieve the security isolation effect.

By means of this embodiment, by allocating the services to be allocated including the sensitive information to the operating system that is low in frequency of interaction with the users, hard core level security isolation may be performed on the system services, thereby improving the safety of service execution.

Optionally, the resource allocation results corresponding to the group of services to be allocated may be, but is not limited to, determined by using the following manner.

According to the allocation result of the group of services to be allocated, in combination with resource utilization of the processing resources of the first operating system and resource utilization of the processing resources of the second operating system, the resource mapping table of the group of services to be allocated and the processing resources of the processor is generated.

In this embodiment, the allocation result of the group of services to be allocated is configured to indicate the correspondence relationship between the services to be allocated and the operating systems. The services to be allocated that are allocated to the operating system are generally executed by using the processing resources of the operating system; and if a service quantity allocated to the operating system is excessive and there is no unallocated processing resource currently, the unallocated processing resources may also be allocated to the services to be allocated that are allocated to the operating system. Therefore, according to the allocation result of the group of services to be allocated, in combination with resource utilization of the processing resources of the first operating system and resource utilization of the processing resources of the second operating system, the resource mapping table of the group of services to be allocated and the processing resources of the processor may be generated, so as to indicate the processing resources that are allocated to each service to be allocated.

Herein, each service to be allocated only has a mapping relationship with the processor core, and the same processor core may have a mapping relationship with a plurality of services to be allocated. Different services may have a mapping relationship with the same processor core through different time slices occupying the same processor core. At the same time, the same processor core is only occupied by one service, that is, only configured to execute one service. Different services allocated to one operating system may determine the time slice occupying the same processor core according to the allocation time, the requirement for the service response speed, or other manners.

For example, the dynamic resource allocation module performs dynamic adjustment on the processor resources according to an output result of the service management module, so as to form the resource mapping table of different services and actual hardware resources; and the deployment structure of different hardware resources under the heterogeneous operating system is optimized, so as to achieve the purpose of improving a full system hardware resource utilization rate. The above dynamic resource allocation process is managed and configured by the software in the second operating system.

Using an eight-core processor (Core 1 to Core 8) as an example, the processor core that have been scheduled to the first operating system include Core 1; and the processor core that have been scheduled to the second operating system include Core 2, Core 3 and Core 4. There are 6 services to be allocated; the real-time services are Service 1 and Service 2; and non-real-time services are Service 3 to Service 6. The corresponding processor cores are allocated for the 6 services; Core 1 is allocated for Service 1; Core 5 is allocated for Service 2; Core 2 is allocated for Service 3; Core 3 is allocated for Service 4; Core 4 is allocated for Service 5; and Core 6 is allocated for Service 6.

By means of this embodiment, the rationality of processing resource allocation may be guaranteed on the basis of the correspondence relationship between the services and the operating systems, in combination with processing resource utilization of different operating systems.

Optionally, the processing resources of the processor may be, but are not limited to, allocated to the first operating system and the second operating system according to the operating systems corresponding to each service to be allocated and the resource allocation result by using the following manners: when it is determined, according to the resource allocation result, that there are services to be allocated corresponding to the unallocated processing resources in the processing resources of the processor, allocating the unallocated processing resources to the operating system to which the services to be allocated corresponding to the unallocated processing resources are allocated.

When the processing resources are allocated, if there are services to be allocated corresponding to the unallocated processing resources in the processing resources of the processor, that is, the unallocated processing resources are allocated to the services to be allocated, the unallocated processing resources may be allocated to the operating system to which the services to be allocated corresponding to the unallocated processing resources are allocated.

Optionally, the resource adaptive scheduling module may complete the actual scheduling action on the processing resources of the processor according to the dynamic resource allocation result. The resource adaptive scheduling module schedules a part of the processor cores to execute the services that are allocated to the first operating system, for example, M cores of a core group 1; and the rest of the processor cores are scheduled to run the services that are allocated to the second operating system, for example, N cores of a core group 2.

By using the eight-core processor as an example, the unallocated Core 4 may be allocated to the first operating system according to the service allocation result and the resource allocation result; and the unallocated Core 5 and Core 6 are allocated to the Linux system. The overall scheduling process may be led by the second operating system.

By means of this embodiment, the utilization rate of the processor resources may be improved by scheduling the unallocated processor resources to the corresponding operating systems on the basis of the resource allocation result.

In an exemplary embodiment, in an optional implementation, an inter-core communication method is provided. The method includes the following steps.

At S1, the first operating system sends target data (which may be the service data) to a target virtual channel (which may be the storage space) in a processor memory.

Optionally, the target data is the data to be sent. The target virtual channel is an idle storage space in the memory. The first operating system sending the target data to the target virtual channel in the processor memory means that a CPU core of the first operating system writes, into the target virtual channel, the data to be transmitted.

At S2, the first operating system sends an interrupt notification message (which may be the inter-core interrupt request) to the second operating system. Optionally, the CPU core of the first operating system sends the interrupt notification message to a CPU core of the second operating system. The interrupt notification message may carry an address of the target virtual channel, and is configured to notify the second operating system to acquire the target data from the target virtual channel. The interrupt notification message may be triggered by software or hardware.

At S3, the second operating system acquires the target data from the target virtual channel in the memory in response to the interrupt notification message. Optionally, the CPU core of the second operating system analyzes the address of the target virtual channel from the interrupt notification message in response to the interrupt notification message, and then positions the target virtual channel in the memory according to the analyzed address, so as to acquire the target data from the target virtual channel, thereby achieving the data interaction between the first operating system and the second operating system.

By means of the above steps, when the plurality of operating systems run on the processor need to transmit data mutually, the first operating system sending the data sends the target data to the target virtual channel in the processor memory, and sends the interrupt notification message to the second operating system. The second operating system receiving the data acquires the target data from the target virtual channel in response to the interrupt notification message. Therefore, the problems that an inter-core communication process wastes resources and is highly dependent on the operating system are solved, and the effect of reducing resource waste and dependence on the operating system during the inter-core communication process is achieved.

In an exemplary embodiment, the memory includes a data storage area and a metadata storage area. The data storage area is divided into a plurality of storage units, and each storage unit is configured to store the service data. The metadata storage area is configured to store the size and occupied state of each storage unit of the data storage area.

Optionally, the target virtual channel is formed by one or a plurality of storage units of the data storage area. The metadata storage area may be divided into storage slices with the same number as the storage units. Each storage slice is configured to record the size and occupied state of one storage unit. The size of the storage unit may be represented by a head address and an end address of the storage unit, and may also be represented by the lengths of the head address and the end address. An occupation state includes the occupied state and an unoccupied state, and may be represented by the value of a free token.

In an exemplary embodiment, the first operating system sending the target data to the target virtual channel in the processor memory includes: reading records in the metadata storage area by the first operating system, and determining, according to the read records, at least one storage unit that is in an idle state in the data storage area and has a total space greater than or equal to the length of the target data, so as to obtain the target virtual channel; and setting, to the occupied state, the state of the at least one storage unit corresponding to the target virtual channel in the metadata storage area, and storing the target data to the target virtual channel.

It is to be noted that, in order to ensure that the target data may be continuously written into the memory, the written target virtual channel needs a storage space that is idle and greater than or equal to the length of the target data. Since the memory is divided into the metadata storage area and the data storage area, the occupation state of each storage unit recorded in the metadata storage area may be read, so as to find the storage units that are in an idle state and may meet data storage requirements.

For example, the size of each storage unit is the same. If the length of the target data is greater than the length of the storage space, the number of the storage units required is determined according to the length of the target data, such that a plurality of continuous storage units that are in the idle state and with the number meeting the data storage requirements are found, so as to form the target virtual channel.

For another example, the size of each storage unit is the same, and the storage units have been combined in the data storage area in advance, so as to obtain a plurality of virtual channels with different sizes. Each virtual channel is formed by combining one or the plurality of storage units, and may read the occupation state of each virtual channel that is recorded in the metadata storage area, so as to find the virtual channel that is in the idle state and has the length greater than the length of the target data, that is, the target virtual channel. It is to be noted that, when system software needs to apply a shared memory space, whether the length of the data to be applied is greater than the maximum length of the data stored in the virtual channel is determined; and if the length is greater than the maximum length of the data stored in the virtual channel, the system software may send the data to be sent in a plurality of times, so as to ensure that the length of the data sent each time is less than or equal to the maximum length of the data stored in the virtual channel, thereby guaranteeing a smooth communication.

In an exemplary embodiment, the second operating system acquiring the target data from the target virtual channel in the memory in response to the interrupt notification message includes: reading the records in the metadata storage area by the second operating system, and determining the target virtual channel according to the read records; and acquiring the target data from the at least one storage unit corresponding to the target virtual channel, and setting the state of the at least one storage unit to the idle state.

That is to say, after the second operating system extracts the target data from the storage unit corresponding to the target virtual channel, in order not to affect the use of the target virtual channel by other systems or tasks, the state of the storage unit corresponding to the target virtual channel is set to the idle state.

In an exemplary embodiment, the first operating system sending the target data to the target virtual channel in the processor memory includes: receiving the target data by a driving layer of the first operating system, and determining, in the memory, the virtual channel in the idle state, so as to obtain the target virtual channel; and setting the state of the target virtual channel to the occupied state, and storing the target data to the target virtual channel.

Optionally, both the RTOS and the non-RTOS have the driving layers. After the driving layer receives the target data to be sent, an interface is called to find the target virtual channel from the memory. In order to prevent other systems from applying to use the target virtual channel during a process of writing the data, after the target virtual channel is found, the state of the target virtual channel is set to the occupied state, and then the target data is written into the target virtual channel.

In an exemplary embodiment, when the first operating system includes an application layer, the application layer is provided with a human-computer interaction interface. Before the driving layer of the first operating system determines the virtual channel in the idle state in the memory, by means of the human-computer interaction interface, data to be sent that is inputted by a user is received by the application layer of the first operating system; a preset format is used to encapsulate the data to be sent, so as to obtain the target data; and a data writing function is called to transmit the target data to the driving layer by means of a preset communication interface, where the preset communication interface is provided on the driving layer.

Optionally, the application layer fills the data to be sent according to the preset format, so as to obtain the target data; then a device file ipidev is generated at a /dev path of the system. When the application layer needs to read and write the data from the driving layer, an open function built-in the system may be first used to open the device file /dev/ipidev; then a write function built-in the system may be used to send the target data from the application layer to the driving layer; and the driving layer then puts the data in the target virtual channel in the shared memory, and then triggers the interrupt to notify the second operating system to obtain the data.

In an exemplary embodiment, the second operating system acquiring the target data from the target virtual channel in the memory in response to the interrupt notification message includes: triggering an interrupt processing function by the second operating system on the basis of the interrupt notification message, determining the target virtual channel from the memory through the interrupt processing function, and acquiring the target data from the target virtual channel.

In an exemplary embodiment, the step of determining the target virtual channel from the memory through the interrupt processing function, and acquiring the target data from the target virtual channel includes: calling a target task through the interrupt processing function, determining the target virtual channel from the memory by the target task, and acquiring the target data from the target virtual channel.

Optionally, the interrupt processing function sends a task notification to wake up the target task responsible for data extraction; and the target task first calls the interface to find the target virtual channel in the shared memory, then reads the target data from the target virtual channel, and performs data analysis.

In an exemplary embodiment, when the second operating system includes an application layer, the memory stores a function identifier. The function identifier indicates a target function. The step of determining the target virtual channel from the memory through the interrupt processing function, and acquiring the target data from the target virtual channel includes: determining the function identifier and the target virtual channel from the memory through the interrupt processing function, and sending address information of the target virtual channel to a target application program matching the function identifier, where the target application program is a target application program in the application layer; and calling a data reading function by the target application program, and transmitting the address information to the driving layer through the preset communication interface; acquiring, by the driving layer, the target data from the target virtual channel, and transmitting the target data to the target application program, where the preset communication interface is provided at the driving layer; and processing the target data by the target application program according to a processing function matching the function identifier, so as to execute a target function.

Optionally, after the second operating system receives the interrupt notification message, the application layer calls the corresponding interrupt processing function to find the target virtual channel from the memory, so as to obtain the address information of the target virtual channel; then the device file ipidev is generated at the /dev path of the system. When the application layer needs to read and write the data from the driving layer, the open function built-in the system may be first used to open the device file /dev/ipidev; then a read function built-in the system may be used to read the target data in the target virtual channel. That is to say, the driving layer finds the corresponding target data from the shared memory according to the address information of the target virtual channel, and returns the target data and the length of the target data to the application layer. In an exemplary embodiment, the state of the target virtual channel is set to be idle.

It is to be noted that, different application programs of the application layer may implement different functions by using the target data. The memory stores a function identifier, which indicates the target function implemented by the application program through the target data. Optionally, the function identifier may be Net or Cmd. When the system is initialized, the Net, the Cmd and a PID of the application program are registered to a drive; the driving layer may find the PID of the application program according to the received NetFn and Cmd; and the PID sends the data to the corresponding application program.

For example, NetFn=1 and Cmd=1 indicate that the first operating system and the second operating system send “hello word” to each other. When the system starts, an array is initialized. There are three columns in the array; and the first column is NetFn, the second column is Cmd, and the third column corresponds to the processing functions of the NetFn and the Cmd, and is recorded as xxCmdHandler. For example, when the second operating system receives a message sent by the first operating system, the NetFn and the Cmd are obtained from the message; and if it is determined that NetFn=1 and Cmd=1, the processing function HelloCmdHandler corresponding to “helloword” is executed to complete a corresponding function.

In an exemplary embodiment, the data storage area includes a plurality of memory channels, and each memory channel is formed by one or the plurality of storage units. The metadata storage area stores a plurality of records, and each record is configured to record metadata of one memory channel. The metadata of each memory channel at least includes a channel ID of the memory channel, the size of the memory channel, and the occupied state of the memory channel. The step of reading the records in the metadata storage area by the first operating system, and determining, according to the read records, at least one storage unit that is in the idle state in the data storage area and has the total space greater than or equal to the length of the target data, so as to obtain the target virtual channel includes: traversing the records stored in the metadata storage area, and determining whether there is a first target record indicating that the memory channel is in the idle state and the size of the memory channel is greater than or equal to the length of the target data; and if there is the first target record, determining, as the target virtual channel, the memory channel indicated by the channel ID recorded in the first target record.

It is to be noted that, the data storage area may be divided into n virtual memory channels, and each memory channel may have different sizes. That is to say, the sizes of the n virtual channels are 20*m, 21*m, 22*m, 23*m, . . . , 2n−1*m in sequence, where m is the size of one storage unit; and the following structure bodies are designed as metadata management memory channels:

```
typedef struct {
uint32_t Flag;
uint16_t ChannelId;
uint8_t  SrcId;
uint8_t  NetFn;
uint8_t  Cmd;
uint32_t Len;
uint32_t ChannelSize;
```

-continued

```
uint8_t   *pData;
uint8_t   CheckSum;
}IpiHeader_T
```

Where uint32_t Flag represents the state of the memory channel, for example, 0xA5A5A5A5 indicates that the channel is non-null, otherwise it is null; uint16_t ChannelId represents the channel ID; uint8_t SrcId represents a source CPU ID, and a source CPU refers to the CPU writing the data into the memory channel; uint8_t NetFn and uint8_t Cmd are function parameters; uint32_t Len is the length of the data stored in the memory channel; uint32_t ChannelSize represents the size of the memory channel; uint8_t *pData refers to a head address of the memory channel; and uint8_t CheckSum refers to checksum. When the first operating system needs to send data, a check value is calculated from the sent data through checking and a algorithm, and the check value is sent to the second operating system. When the second operating system receives the data and the check value, a check value is calculated according to the received data through the same checking and algorithm; the calculated check value is compared with the received check value; if so, it indicates that the received data is valid; and if no, it indicates that the received data is invalid. Each virtual memory channel corresponds to one structure body record. The structure body records are stored at a starting position of the shared memory in sequence according to an incremental mode of the channel IDs. After the system is powered on, these structure body records are initialized. Initializing Flag to 0 indicates that the channel is null; ChannelId is initialized to 0, 1, 2, . . . , and n−1 in sequence; ChannelSize is initialized to the size of the corresponding virtual memory channel; and pData is initialized to point to the head address of the corresponding virtual memory channel.

In an exemplary embodiment, when the first operating system determines the target virtual channel, an interface GetEmptyChannel is used to find the virtual channel meeting the following two conditions from all the memory channels according to the size of the target data to be sent: a free token Flag in a channel structure body IpiHeader is not equal to 0xA5A5A5A5 (that is, the channel is in the idle state), and the size ChannelSize of the channel in the channel structure body IpiHeader is greater than or equal to the size of the target data (that is, the size of the memory may meet a storage requirement of the target data). After the target virtual channel meeting the above conditions is found, the state of the channel is set to be non-null. That is to say, the free token Flag in the channel structure body IpiHeader is set to 0xA5A5A5A5, and then the target data is copied into the target virtual channel.

In an exemplary embodiment, when the memory channel is occupied, the metadata of the memory channel further includes an ID of the source CPU core of the target data and an ID of a destination CPU core of the target data. The step of reading the records in the metadata storage area by the second operating system, and determining the target virtual channel according to the read records includes: traversing the records stored in the metadata storage area, and determining whether there is a second target record, where the second target record indicates that the memory channel is in the occupied state and the ID of the destination CPU core is an ID of a CPU core of the second operating system, and the ID of the source CPU core is not the ID of the CPU core of the second operating system; and when there is the second target record, determining, as the target virtual channel, the memory channel indicated by the channel ID recorded in the second target record.

That is to say, the target virtual channel is the virtual channel in all the channels that meets the following three conditions: a first condition is that the free token Flag in the channel structure body IpiHeader is equal to 0xA5A5A5A5 (that is, indicating that the channel is in the occupied state); a second condition is that TargetId in the channel structure body is equal to an ID of the current CPU (that is, indicating that a destination CPU of the target data is the CPU of the second operating system); and a third condition is that the TargetId in the channel structure body is not equal to SrcId (that is, indicating that the target data is not sent by the CPU of the second operating system).

It is to be noted that, if 1 bit is used to represent the free token Flag, 0 indicates that the channel is null, and 1 indicates that the channel is non-null; and if the Flag is 0 originally, but is mutated to 1, it is considered that the channel is non-null after the system reads the Flag, causing an abnormal communication. In this embodiment, the free token Flag is set to a plurality of special characters, such as 0xA5A5A5A5. Since a plurality of bits are simultaneously mutated to the special characters, the probability is considerably less than 1-bit mutation probability, such that the mutation of a storage medium bit may be prevented from affecting the value of the Flag, thereby improving the safety of communications.

In an exemplary embodiment, there is a state mapping table stored in the metadata storage area. There are a plurality of records in the state mapping table, and each record is configured to record the occupied state of one storage unit. The step of reading the records in the metadata storage area by the first operating system, and determining, according to the read records, at least one storage unit that is in the idle state in the data storage area and has the total space greater than or equal to the length of the target data, so as to obtain the target virtual channel includes: determining the preset number of the storage units to be occupied by the target data; successively scanning each record from an initial position of the state mapping table; when the consecutive preset number of target records is scanned, determining the consecutive storage units indicated by the preset number of target records, where the target records indicate that the storage units are in the idle state; and determining the consecutive storage units as the target virtual channel.

It is to be noted that, for ease of storage and extraction of the data, since the operating system needs to occupy the consecutive storage units in the memory when transmitting the service data, the number of the storage units in a memory request instruction needs to be determined first; and since the memory space of each storage unit is the same, the preset number of the consecutive storage units required may be calculated by means of the space size of the required memory, and is recorded as numb.

Optionally, the first operating system traverses the records from an index position in the state mapping table. The index position may be the initial position of the state mapping table. Starting from the initial position of the state mapping table, each record of the mapping table is queried in sequence to determine whether there are consecutive records with free memory pages greater than or equal to the numb; if there are records meeting the above condition, the consecutive storage units in the processor are determined by recording a correspondence relationship with the memory pages; and the consecutive storage units are determined as the target virtual channel, so as to write the data into the target virtual channel.

In an exemplary embodiment, the interrupt notification message includes the head address and preset number of the consecutive storage units. The step of reading the records in the metadata storage area by the second operating system, and determining the target virtual channel according to the read records includes: successively scanning each record from an initial position of the state mapping table; and when the recorded head address of the consecutive storage units is scanned, determining, as the target virtual channel, the storage units indicated by the scanned address and the consecutive storage units with the present number minus one.

Optionally, the consecutive storage units refer to the consecutive storage units of which number is equal to the numb. Each record in the state mapping table further records the head address of the corresponding storage unit. When the second operating system scans, from the mapping table, the record of the head addresses of the consecutive storage units of which number is equal to the numb, it indicates that the head address of the target virtual channel is scanned. The storage unit indicated by the head address and the consecutive numb-1 storage units after the storage unit form the target virtual channel. The second operating system acquires the data from the target virtual channel, so as to complete the interaction with the data of the first operating system.

In an exemplary embodiment, the scanned consecutive target records are recorded by a counter; during the process that each record is scanned in sequence from the initial position of the state mapping table according to the number of the storage units, and when the target records are currently scanned, the counter is controlled to plus one; and when non-target records are not scanned currently, the counter is controlled to reset.

Optionally, whether there is the consecutive preset number of target records, that is, whether there is the preset number of the consecutive storage units, is determined by using a relationship between the value of the counter and the number of the required storage units. Optionally, the count of the counter is recorded as cntr. If the scanned storage unit is null, an operation of adding 1 to the cntr is performed; if the scanned storage unit is not null, the number cntr of the accumulated and consecutive storage units in the idle state is cleared, and the consecutive storage units that are in the idle state are continuously found by starting from the address after the storage unit, until the cntr is equal to the numb, indicating that the consecutive storage units that are in the idle state and meet the memory requirements have been found; and if there is no cntr greater than or equal to the numb after the entire state mapping table is scanned, it indicates that the current dynamic request for memory fails, and there is no preset number of the consecutive storage units.

In an exemplary embodiment, before the first operating system reads the records in the metadata storage area, and determines, according to the read records, at least one storage unit that is in the idle state in the data storage area and has the total space greater than or equal to the length of the target data, so as to obtain the target virtual channel, the method further includes: sending the memory request instruction by the first operating system, and executing a locking operation on the memory of the processor, where the memory request instruction is configured to request to use the memory of the processor; and reading the records in the state mapping table when the memory is successfully locked.

Optionally, the memory request instruction is an instruction that the operating system run on the processor sends a request to use the memory of the processor. It is to be noted that, in order to prevent request conflicts when the plurality of operating systems simultaneously request to use the memory of the processor, the locking operation is first executed on the memory of the processor when the operating system sends the memory request instruction; the memory may only be requested to use after locking is successful, and the locking operation refers to an exclusive operation of memory request; and after the current operating system successfully performs locking, and if locking is not released, other servers do not have permission to use the processor memory.

In an exemplary embodiment, the step of executing the locking operation on the memory of the processor includes: determining whether the memory is currently in a locked state, where the locked state represents a state that the memory is requested for use; executing the locking operation on the memory when the memory is not currently in the locked state; and when the memory is currently in the locked state, determining that the locking of the memory fails, and requesting to lock the memory of the processor again after a preset duration, until the memory is successfully locked, or until the number of times for requesting for locking is greater than the preset number of times.

Before the processor runs, an initialization operation needs to be performed on the metadata storage area and the data storage area in the processor. Optionally, the records stored in the state mapping table in the metadata storage area are initialized, and the initialization operation is performed on memory management information.

Before a memory request operation is performed, the following configurations are performed on the memory management information.

```
typedef struct {
uint32_t MemReady;
uint32_t MemLock;
}MallocMemInfo_T;
```

where a member variable MemLock of a structure body MallocMemInfo_T indicates whether the shared memory has been initialized; a variable MemReady is 0xA5A5A5A5, and indicates that the initialization operation has been completed, and dynamic request and memory releasing may be normally performed; and a member variable MemReady of the structure body MallocMemInfo_T represents whether it is locked.

Optionally, if the variable MemLock is read to be 0, it indicates that there is no system or task requesting for memory at the moment, that is, the memory is not in the locked state currently. If the variable MemLock is read to be 0xA5A5A5A5, it indicates that there is a system or a task requesting for memory, and re-requesting needs to wait until the current request is completed, such that the locking of the current request fails.

In an exemplary embodiment, if locking failure occurs when the locking operation is performed on the memory, the locking of the memory is requested again after waiting for the preset duration, until locking is succeeded. For example, the preset duration may be 100 microseconds. In an exemplary embodiment, if the locking of the request fails, and the number of times for repeated requests exceeds the preset number of times, it indicates that the memory in the processor within the current duration is in an unallocable state, and then the request operation is stopped. For example, the preset number of times may be 3. When the number of times for locking requests is greater than 3, a message that the current memory is unavailable may be returned to the operating system sending the request.

Optionally, after there is the target virtual channel that may be used by the first operating system in the memory space of the processor, the first operating system stores the target data to be transmitted to the corresponding target virtual channel. In an exemplary embodiment, the occupation state of the memory space of the processor is updated according to a data writing condition of the first operating system, that is, a target consecutive memory space is changed from the unoccupied state to the occupied state. In addition, in order to cause other systems or tasks to request for memory, the locking of the memory is released.

In an exemplary embodiment, the method further includes: releasing the locking of the memory when the consecutive preset number of target records is not scanned.

Optionally, after the records in the state mapping table are scanned, the preset number of consecutive storage units that are in the idle state is not detected, and it indicates that there is no enough space memory page in the memory of the processor for the first operating system to use, such that the current dynamic request for memory fails, and the locking of the memory is released.

In an exemplary embodiment, the interrupt notification message is sent to the second operating system by means of a Software Generated Interrupt (SGI). Optionally, the step of sending the interrupt notification message to the second operating system by means of the SGI includes: writing an interrupt number and the ID of the CPU core of the second operating system to a preset register of the processor, and generating the interrupt notification message on the basis of the interrupt number and the ID of the CPU core of the second operating system.

Optionally, the SGI is an interrupt generated by the software; and the software may send the interrupt to the CPU core that executes the software, and may also send the interrupt to other CPU cores. The preset register may be a GICD_SGIR register; an SGI number and a destination CPU ID may be written into the GICD_SGIR register through the software, so as to generate the SGI; and the SGI number is the SGI number reserved for inter-core communication.

In a multi-core heterogeneous operating system, in order to maximize the compatibility with a resource allocation mode, No. 8-15 (8 interrupts in total) are used to represent an inter-core interrupt vector table. When the first operating system is the RTOS and the second operating system is the Linux operating system, one feasible allocation plan of the vector table is shown in Table 1.

TABLE 1

| Serial Number | Interrupt number | Trigger source | Response source | Meaning |
|---|---|---|---|---|
| 1 | 8 | RTOS core | Linux core | The RTOS proactively releases a CPU core |
| 2 | 9 | Linux core | RTOS core | The Linux system requests to take over the CPU core |
| 3 | 10 | RTOS core | Linux core | The RTOS passively releases the CPU core |
| 4 | 11 | RTOS core | Linux core | The RTOS rejects to release the CPU core |
| 5 | 12 | RTOS core | Linux core | The RTOS occupies the CPU core |

Optionally, the hardware interrupt refers to an interrupt generated by a hardware device, and may be a privately-owned peripheral interrupt, or may also be a shared peripheral interrupt. It is to be noted that, the hardware interrupt is the interrupt introduced by hardware outside the CPU, and is random in nature; and the SGI is the interrupt introduced by the interrupt instruction executed by the software run in the CPU, and is predetermined. The mode of generating the interrupt notification message is not limited in this embodiment.

In an optional implementation, a method for sharing a memory is provided. The method includes the following step.

At S1, the memory request instruction is received, and the locking operation is executed on the memory of the processor. The memory request instruction is configured to request to use the memory of the processor.

Optionally, the memory request instruction is an instruction that is issued by the first operating system running on the processor to request the use of the memory of the processor. It is to be noted that, in order to prevent request conflicts when the plurality of operating systems simultaneously request to use the memory of the processor, the locking operation is first executed on the memory of the processor when the operating system sends the memory request instruction; the memory may only be requested to use after locking is successful, and the locking operation refers to an exclusive operation of memory request; and after the current operating system successfully performs locking, and if locking is not released, other servers do not have permission to use the processor memory.

In the method for sharing a memory provided in this embodiment of the present application, before the locking operation is executed on the memory of the processor, the method further includes: determining whether the memory is currently in the locked state, where the locked state represents the state that the memory is requested for use; and executing the locking operation on the memory when the memory is not currently in the locked state.

Optionally, since request conflicts occurs when the plurality of systems or the plurality of tasks simultaneously request to use the memory, the memory of the processor can only be locked by one system or task within the same time period, such that when it is detected that the current memory is not in the locked state, the current operating system can execute the locking operation on the memory.

Optionally, whether the memory is in the locked state is determined by determining whether a preset variable stored in the memory is a preset value; if the preset variable is not a preset parameter number, it indicates that the memory is not in the locked state, and there is no other system or task requesting for memory spaces, such that the locking succeeds; otherwise, the preset variable is a preset parameter, it indicates that the memory is in the locked state at the current moment, and there are other systems or tasks other than the operating system requesting for the memory spaces, such that the locking fails.

In the method for sharing a memory, after whether the memory is currently in the locked state is determined, the method further includes: when the memory is currently in the locked state, determining that the locking of the memory fails; and when the locking of the memory fails, requesting again to lock the memory of the processor after the preset duration, until the memory is successfully locked, or until the number of times for requesting for locking is greater than the preset number of times.

Optionally, if locking failure occurs when the locking operation is performed on the memory, the locking of the memory is requested again after waiting for the preset duration, until locking is succeeded. For example, the preset duration may be 100 microseconds.

In an exemplary embodiment, if the locking of the request fails, and the number of times for repeated requests exceeds the preset number of times, it indicates that the memory in the processor within the current duration is in an unallocable state, and then the request operation is stopped. For example, the preset number of times may be 3. When the number of times for locking requests is greater than 3, a message that the current memory is unavailable may be returned to the operating system sending the request.

At S2, when the memory is successfully locked, the occupied state of the memory is read, and whether there is an idle target memory space in the memory is determined according to the occupied state of the memory. The size of the target memory space is greater than or equal to the size of the memory requested by the memory request instruction.

After request locking succeeds, the operating system requests for the memory of the processor. Optionally, information used for recording the occupied state of the memory is scanned according to the memory request instruction issued by the operating system; and whether there is the target memory space is determined. That is to say, whether there are consecutive memory spaces that are in the unoccupied state and may meet memory usage requirements in the processor is determined. Meeting the memory usage requirements means that the size of the memory space is greater than or equal to the size of the memory requested by the operating system. In an exemplary embodiment, whether the sizes of the consecutive memory spaces that are in the unoccupied state are greater than or equal to the size of the memory requested by the operating system is determined, so as to obtain a determination result.

It is to be noted that, discontinuous memory spaces may also be used when the memory is requested. A pointer may be added after a memory block which is not the smallest, and points to the next smallest memory block obtained through request. In addition, when data is read and written, data reading and writing across data blocks are realized according to a storage address and the pointer. The form of the target memory space is not limited in this embodiment.

At S3, when there is the target memory space in the memory, the address information of the target memory space is fed back to a sending end of the memory request instruction, the occupied state of the memory is updated, and the locking of the memory is released. Herein, the sending end refers to the operating system (for example, the first operating system) sending the memory request instruction. It is to be noted that, since the operating system sends and receives the data by using the shared memory during inter-core communication, and accesses the data by using an address returned by the requested memory during data sending and receiving, the address information of the memory space that has been requested needs to be determined.

Optionally, after there is the target memory space (which may be indicated by the determination result) that may be used by the operating system in the memory spaces of the processor, the address information of the target consecutive space is sent to the operating system, and according to the address information, the operating system stores, in the corresponding memory space, the data to be transmitted.

In an exemplary embodiment, the occupation state of the memory spaces of the processor is updated according to the data writing condition of the first operating system. That is to say, the target memory space is changed from the unoccupied state to the occupied state, and the locking operation before dynamic memory requesting is released, so as to cause other operating systems to request to use the memory spaces of the processor.

By means of the above steps, the problems of low use efficiency, poor flexibility and over-dependence on the operating system of the memory sharing among a plurality of cores are solved, and the effect of improving the flexibility and use efficiency of the shared memory and reducing the dependence on the operating system is achieved.

In the method for sharing a memory, the memory includes the metadata storage area and the data storage area. The data storage area is configured to store the service data. The metadata storage area stores the state mapping table, and the state mapping table is configured to record the occupied state of the data storage area. The step of reading the occupied state of the memory, and determining, according to the occupied state of the memory, whether there is the idle target memory space in the memory includes: reading the records in the state mapping table from the metadata storage area, and determining, according to the records in the mapping table, whether there is the target memory space in the data storage area.

The occupied state of the memory is queried by means of querying the records in the state mapping table. Optionally, the metadata storage area stored in the processor is acquired, and the state mapping table in the metadata storage area is identified; the occupied state of the data storage area is read by traversing the records in the state mapping table; and whether there are consecutive memory spaces that are in the idle state and meet the memory usage requirements in the data storage area is determined.

In the method for sharing a memory provided in this embodiment of the present application, the data storage area is formed by a plurality of memory pages; and there are the plurality of records in the state mapping table, and each record is configured to record an occupied state of the memory page. The step of reading the records in the state mapping table from the metadata storage area, and determining, according to the records in the state mapping table, whether there is the target memory space in the data storage area includes: determining the preset number of the memory pages requested by the memory request instruction; successively scanning each record from the initial position of the state mapping table; and when the a consecutive preset number of target records is scanned, determining that there is the target memory space in the memory, where the target records indicate that the memory pages are in the idle state.

It is to be noted that, the data storage area is divided into a plurality of allocation units according to the memory size, and each allocation unit is recorded as one memory page. For example, the memory space of the data storage area is A bytes, and the divided allocation units are B bytes, such that the data storage area totally includes A/B memory pages. The records in the state mapping table are memory page records, and each memory page record is configured to record the occupied state of the memory page. The number of the memory page records in the state mapping table is the same as the number of the memory pages in the data storage area.

Figures 9, 10:
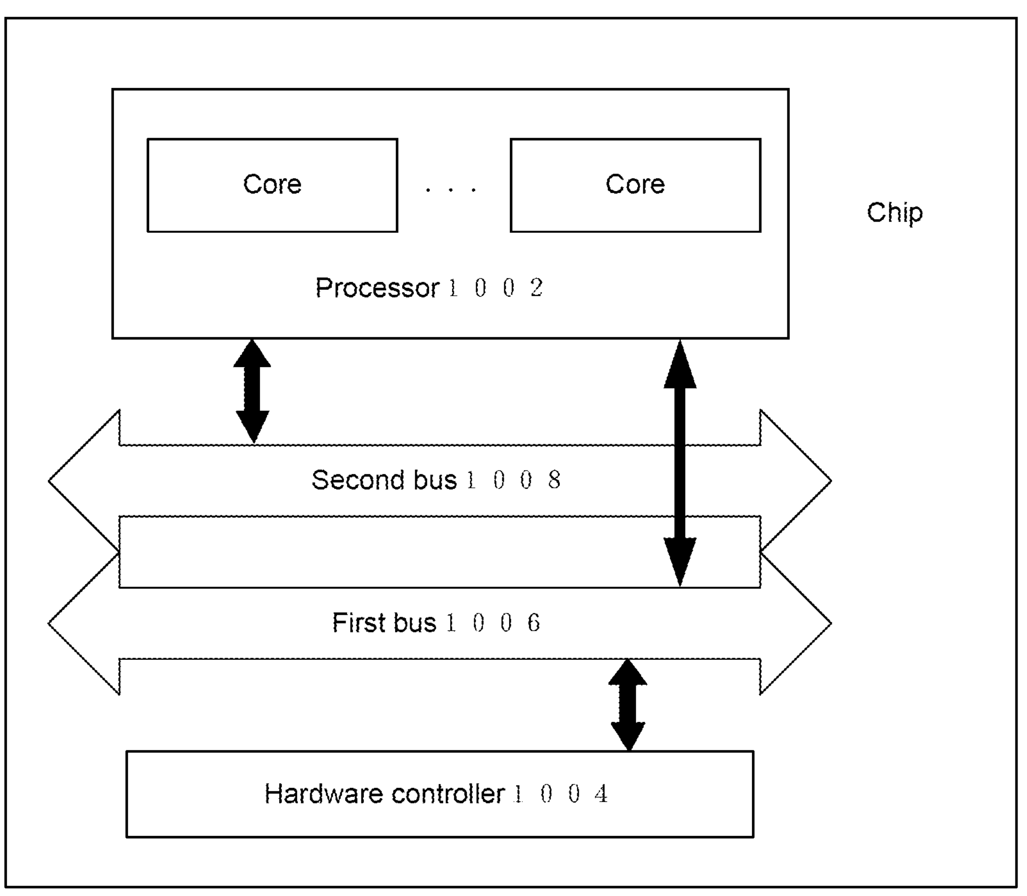
FIG. 9 is a schematic diagram of still another optional embedded system start control method according to an embodiment of the present application.
FIG. 10 is a schematic diagram of an optional embedded system according to an embodiment of the present application.

FIG. 9 is a schematic diagram of a relationship between a state mapping table and a memory page in a method for sharing a memory according to an embodiment of the present application. As shown in FIG. 9, the data storage area is a dynamic allocation memory block area; and the metadata storage area includes a dynamic allocation memory mapping table area. The state mapping table area is divided into the same number of the records as the number of the memory pages in the data storage area; the records are recorded as the memory page records; and all the memory page records are combined into the state mapping table. All the memory page records in the state mapping table are in a one-to-one correspondence relationship with all the memory pages in the data storage area. Each memory page record indicates an allocation state of the corresponding memory page, that is, whether the memory page is occupied.

Optionally, since the operating system needs to occupy the consecutive memory pages in the processor when performing cooperation of the service data, the preset number of the memory pages in a memory request instruction first needs to be determined first; and since the memory space of each memory page is the same, the preset number of the consecutive memory pages required may be calculated by means of the space size of the required memory, and is recorded as numb.

In an exemplary embodiment, after the state mapping table in the metadata storage area of the processor is acquired, the memory page records are traversed from the index position in the state mapping table. The index position may be the initial position of the state mapping table. Starting from the initial position of the state mapping table, each memory page record of the state mapping table is queried in sequence to determine whether there are consecutive memory page records with free memory pages greater than or equal to the numb; and if there are memory page records meeting the above condition, through a correspondence relationship between the memory page records and the memory pages, it is determined that there is the target memory space in the processor.

In the method for sharing a memory provided in this embodiment of the present application, after each record is scanned in sequence from the initial position of the state mapping table, the method further includes: determining that there is no target memory space in the memory when all the records in the state mapping table are scanned and there are no consecutive preset number of the target records.

Optionally, starting from the initial position of the state mapping table, whether there are consecutive spaces and have the number of the memory pages greater than or equal to the numb is determined by querying the memory page records of the state mapping table; and if the consecutive preset number of idle memory pages is still not found after the entire state mapping table is scanned, it indicates that there is no target memory space.

In the method for sharing a memory provided in this embodiment of the present application, the number of the scanned target records is recorded by the counter; during the process that each record is scanned in sequence from the initial position of the state mapping table, and when the target records are currently recorded, the counter is controlled to plus one; and when non-target records are scanned currently, the counter is controlled to reset. The non-target records indicate that the memory pages are in the occupied state.

Optionally, whether there is the consecutive preset number of the target records, that is, whether there is the target memory space, is determined by using the relationship between the value of the counter and the number of the required memory pages. Optionally, the count of the counter is recorded as cntr. If the scanned memory page is null, an operation of adding 1 to the cntr is performed; if the scanned memory page is not null, the number cntr of the accumulated and consecutive memory pages in the idle state is cleared, and the consecutive empty memory pages are continuously found by starting from the address after the memory page, until the cntr is equal to the numb, indicating that the consecutive memory pages that are in the idle state and meet the memory requirements have been found; and if the cntr is less than the numb during the scanning of the entire state mapping table, it indicates that the current dynamic request for memory fails, and there is no target memory space.

In the method for sharing a memory provided in this embodiment of the present application, the step of when the initial position is the last position in the state mapping table, feeding back the address information of the target memory space to the sending end of the memory request instruction includes: determining the last scanned target record in the consecutive preset number of the target records, and feeding back, to the sending end, a head address of the memory page indicated by the last scanned target record.

Optionally, when the state mapping table is scanned, a scanning mode may select to scan from the first position of the state mapping table or start scanning from the last position of the state mapping table. When the scanning mode is to scan from the last position of the state mapping table, and when the value cntr displayed by the counter is greater than or equal to the preset number numb, the last memory page scanned records the head address of the corresponding memory page, and the states of these memory pages are set to be non-null in the memory page records; and the head address is used as the head address of the entire consecutive memory page of the current memory request instruction.

In an exemplary embodiment, the address is fed back to the operating system sending the memory request instruction, and the data writing operation is performed on the memory by the operating system according to the address information.

In the method for sharing a memory provided in this embodiment of the present application, the initial position is the first position in the state mapping table. The step of feeding back the address information of the target memory space to the sending end of the memory request instruction includes: determining the first scanned target record in the consecutive preset number of the target records, and feeding back, to the sending end, a head address of the memory page indicated by the first scanned target record.

Optionally, when the scanning mode is to scan from the first position of the state mapping table, and when the value cntr displayed by the counter is greater than or equal to the preset number numb, the address recorded by the first memory page scanned is used as the head address; and the head address is sent to the operating system sending the memory request instruction, and the data writing operation is performed on the memory by the operating system according to the address information.

In the method for sharing a memory provided in this embodiment of the present application, during the process of successively scanning each record from the initial position of the state mapping table, the first target record scanned in the consecutive target records is stored through a preset variable.

Optionally, the preset variable refers to a variable in the state mapping table that is configured to store the address information of the initial position, and is recorded as offset. When the idle and consecutive memory page is scanned each time, the operation of adding 1 to the value cntr displayed on the counter is performed; and when the value cntr displayed on the counter is greater than or equal to the preset number numb, the address information stored by the offset currently is used as the address of the first target record.

In the method for sharing a memory provided in this embodiment of the present application, after the occupied state of the memory is read, and whether there is the idle target memory space in the memory is determined according to the occupied state of the memory, the method further includes: releasing the locking of the memory when there is no idle target memory space in the memory.

Optionally, after the memory page records in the state mapping table are scanned, and when it is detected that the preset number of consecutive idle memory pages is not included, that is, the target memory space is not included, it indicates that there is no enough space memory page in the memory of the processor for the operating system to use, such that the current dynamic request for memory fails, and the locking of the memory is released.

In the method for sharing a memory provided in this embodiment of the present application, the memory includes the metadata storage area and the data storage area. The data storage area is configured to store the service data. The metadata storage area stores memory management information. The step of determining whether the memory is currently in the locked state includes: reading the memory management information stored in the metadata storage area, and determining whether the memory management information includes preset information, where the preset information indicates that the memory is in the locked state; if the memory management information includes the preset information, determining that the memory is not in the locked state currently; and if the memory management information does not include the preset information, determining that the memory is currently in the locked state.

With regard to determining whether the memory of the processor is in the locked state, determination needs to be performed by using the memory management information in the metadata storage area. Optionally, when the memory management information in the metadata storage area is acquired, whether the memory management information includes the preset information is determined, and the preset information is configured to indicate whether the memory is in the locked state; and if the memory management information does not include the preset information, it indicates that the current memory is in an unlocked state, otherwise the memory is in the locked state.

In the method for sharing a memory provided in this embodiment of the present application, the memory management information includes first field information and second field information; the first field information is configured to describe whether the memory is in the locked state; and the second field information is configured to describe whether the initialization of the memory is completed. Before the memory request instruction is received, the method further includes: initializing the first field information and the second field information that are stored in the data storage area.

Before the embedded system runs, an initialization operation needs to be performed on the metadata storage area and the data storage area in the processor. Optionally, the memory page records stored in the state mapping table in the metadata storage area are initialized, and the initialization operation is performed on the memory management information.

Optionally, the memory management information is formed by the first field information and the second field information. The first field information represents whether to be locked, and the second field information is configured to represent whether initialization is completed.

In the method for sharing a memory provided in this embodiment of the present application, the step of updating the occupied state of the memory includes: changing, to the occupied state, the state of the memory page corresponding to the target memory space recorded in the state mapping table.

Optionally, when the operating system needs to occupy the target memory space, the memory page records in the state mapping table area of the metadata storage area are updated according to the correspondence relationship between the memory pages and the memory page records by identifying the address information of the plurality of memory pages of the target memory space, such that the memory page records are changed from the unoccupied state to the occupied state. Further, the occupation state of the memory spaces of the processor is updated according to the data writing condition of the first operating system. That is to say, the target memory space is changed from the unoccupied state to the occupied state, and the locking operation before the memory is dynamically requested is released.

Optionally, in response to a storage operation of the first operating system, the target data is stored to the target memory space, and the address information of the consecutive memory spaces is sent to the second operating system; and an acquisition instruction sent by the second operating system on the basis of the address information is received, and the target data stored in the target memory space is sent to the second operating system.

Herein, after the memory is successfully requested, the first operating system stores the target data to be transmitted to the requested target memory space, and sends the address information of the target memory space to the second operating system cooperating with the first operating system, so as to notify the second operating system to perform data acquisition. Optionally, after the second operating system receives the address information of the target memory space, the acquisition instruction of the data is sent, and the embedded system receives the instruction and sends the target data stored in the target memory space to the second operating system.

By means of the above steps of receiving the memory request instruction of the first operating system, and executing the locking operation on the memory of the processor, where the memory request instruction is configured to request to use the memory of the processor; when the memory is successfully locked, reading the occupied state of the memory, and determining, according to the occupied state of the memory, whether there is an idle target memory space in the memory, where the size of the target memory space is greater than or equal to the size of the memory requested by the memory request instruction; when there is the target memory space in the memory, feeding back the address information of the target memory space to a sending end of the memory request instruction, updating the occupied state of the memory, and releasing the locking of the memory; in response to a storage operation of the first operating system, storing the target data to the target memory space, and sending the address information of the consecutive memory spaces to the second operating system; and receiving the acquisition instruction sent by the second operating system on the basis of the address information, and sending the target data stored in the target memory space to the second operating system, the problems of low use efficiency, poor flexibility and over-dependence on the operating system of the memory sharing among a plurality of cores are solved, and the effect of improving the flexibility and use efficiency of the shared memory and reducing the dependence on the operating system is achieved.

In an exemplary embodiment, when the first operating system performs a data reading and writing operation by using a physical address, and the second operating system performs the data reading and writing operation by using a virtual address, the second operating system converts the address information of the target memory space into the virtual address, and uses the virtual address to access the memory, so as to read the target data from the target memory space.

Since the address returned by the dynamically-requested memory is used when the shared memory sends and receives the data during inter-core communication, but address systems used by different system may be different, for example, the RTOS is the first operating system, and the non-RTOS is the second operating system. The physical address may be directly used to access the shared memory in the RTOS, and the non-RTOS cannot directly use the physical address to access the shared memory, such that the mapped virtual address needs to be used. After the second operating system receives the address information of the target memory space, conversion is performed through the address information offset, so as to map the address information to the virtual address, and an operation is performed according to the virtual address. Optionally, a shared memory virtual-based address under the non-RTOS is vBase (assuming that a shared memory real physical address is 0x96000000); and a shared memory physical-based address under the RTOS is pBase (that is, 0x96000000).

The address returned by the dynamically-requested memory in the non-RTOS is also the virtual address vData. In the non-RTOS, Offset=vData−vBase; and the data is sent from the non-RTOS to the RTOS, and the RTOS uses an address pData to access the dynamically-requested shared memory pData=pBase+Offset. The address returned by the dynamically-requested memory in the RTOS is the physical address pData. In the RTOS, Offset=pData−pBase; and the data is sent from the RTOS to the non-RTOS, and the non-RTOS uses the address vData to access the dynamically-requested shared memory vData=vBase+Offset.

In an exemplary embodiment, the memory includes the metadata storage area and the data storage area. The metadata storage area and the data storage area are similar to those in the foregoing embodiments, and are not described herein again. Optionally, the metadata storage area stored in the processor is acquired, and the state mapping table in the metadata storage area is identified; each memory page record is traversed from the index position in the state mapping table; each memory page record of the state mapping table is queried in sequence to determine whether there are consecutive memory page records with free memory pages greater than or equal to the preset number; and if there are memory page records meeting the above condition, through a correspondence relationship between the memory page records and the memory pages, it is determined that there is the target memory space in the processor.

This embodiment further provides a method for sharing a memory. The method includes: before the operating system sends the memory request instruction, in order to prevent request conflicts from occurring when the plurality of operating systems simultaneously request the memory spaces of the processor, requiring to request the locking operation, and determining whether the locking succeeds; when the determination result indicates that the dynamically-requested memory is successfully locked, calculating the number of the consecutive memory pages to be allocated according to the size of the memory in the sent memory request instruction, and recording the number as nmemb; if the determination result indicates that the locking of the request fails, sending a request again after waiting for a period of time (which may be 100 microseconds), until the request succeeds; and if the number of times of failed locking requests is greater than the preset number of times (the preset number of times may be three), exiting memory requesting.

In an exemplary embodiment, after the locking request succeeds, the initialization operation is performed on the metadata storage area of the processor, and the last position of the state mapping table is recorded as offset; the number of the consecutive memory pages required is calculated according to the space size of the required memory in the memory request instruction, and the number of the memory pages is recorded as cmemb; then the state mapping table of the metadata storage area in the processor is acquired, and the entire state mapping table starts to be scanned from the offset position of the state mapping table; consecutive empty memory pages are found through the correspondence relationship between the memory page records stored in the state mapping table and the memory pages in the data storage area; if the current memory page scanned is in the occupied state, offset-offset-cmemb; then the data cmemb of the accumulated consecutive empty memory pages in the counter is cleared, and the consecutive empty memory pages are continuously found from a new offset position; if the scanned memory pages are null, that is, in the idle state, the value cmemb of the count is added with 1, and offset-offset-1, so as to continuously determine the next memory page, until the cmemb is equal to the nmemb, that is, when the data of the counter is the same as the space size of the required memory, it indicates that the consecutive memory pages meeting requirements are scanned.

In an exemplary embodiment, the memory pages meeting the requirements are marked as occupied state in the corresponding state mapping table; the head address of the last found memory page is used as the head address of the entire consecutive memory page of the dynamic request; and the lock of the dynamically-requested memory is released, such that the current dynamic request for memory succeeds.

If the value of the offset is less than 0 during the scanning of the entire state mapping table, it indicates that there is no memory page meeting the requirements for the operating system to use; and the lock of the dynamically-requested memory is released, such that the current dynamic request for memory fails.

In addition, the size may also be dynamically adjusted after the space is dynamically requested and found to be insufficient. The updated memory request instruction may be sent again, and the locking operation is executed on the memory; when the locking succeeds, and if the memory space that needs to be requested by the updated memory request instruction is increased, whether there is the required memory space after the target consecutive memory that has been requested is determined; if so, the request succeeds;

and if the memory space that needs to be requested by the updated memory request instruction is reduced, part of the memory space is released.

In this embodiment, the effect of improving the flexibility and use efficiency of the shared memory may be achieved by dividing a plurality of storage areas, using the index position for the dynamic request according to the space size actually required, releasing the space after use, and dynamically adjusting the size after the space is dynamically requested and found to be insufficient.

From the above descriptions about the implementation modes, those skilled in the art may clearly know that the method according to the foregoing embodiments may be implemented in a manner of combining software and a necessary universal hardware platform, and of course, may also be implemented through hardware, but the former is a preferred implementation mode under many circumstances. Based on such an understanding, the technical solutions of the present application substantially or parts making contributions to the conventional art may be embodied in form of software product, and the computer software product is stored in a storage medium (for example, a ROM/RAM), a magnetic disk and an optical disk), including a plurality of instructions configured to enable a terminal device (which may be a mobile phone, a computer, a server, a network device, or the like) to execute the method in each embodiment of the present application.

Still another aspect of an embodiment of the present application further provides an embedded system that is configured to implement the embedded system start control method. FIG. 10 is a schematic diagram of an optional embedded system according to an embodiment of the present application. The embedded system may include:

a chip and at least two operating systems.

The chip includes a processor 1002, a hardware controller 1004, a first bus 1006, and a second bus 1008.

The bandwidth of the second bus 1008 is higher than the bandwidth of the first bus 1006, the second bus 1008 is configured as a multi-master and multi-slave mode, and the first bus 1006 is configured as a one-master and multi-slave mode.

The at least two operating systems run on the basis of the processor 1002. Processing resources of the processor are dynamically allocated to the at least two operating systems, and the processing resources of the processor include processor cores.

The at least two operating systems communicate with each other by means of the first bus 1006.

The at least two operating systems control the hardware controller by means of the second bus 1008.

The chip may be the foregoing BMC chip. The processor may be the foregoing multi-core processor. The hardware controller may be configured to control an external device connected to a corresponding external interface. The first bus is configured to be in a one-master and multi-slave mode, and may be a bus used by the processor for control of the hardware controller, for example, an AHB. The second bus is configured to be in a multi-master and multi-slave mode, and may be a bus used for communication among the plurality of processor cores of the processor, for example, an APB. The bandwidth of the second bus is higher than the bandwidth of the first bus.

The embedded system may include the at least two operating systems, and the at least two operating systems run on the basis of the processor. The processing resources of the processor are dynamically allocated to the at least two operating systems. The processing resources of the processor include the processor cores. The at least two operating systems control the hardware controller via the first bus. The at least two operating systems communicate with each other via the second bus.

Optionally, the at least two operating systems may be configured to implement the embedded system start control method. For example, the first operating system and the second operating system in the at least two operating systems may be configured to implement the embedded system start control method. Optionally, there may be one or a plurality of hardware controllers. The hardware controller may include, but are not limited to, a controller corresponding to at least one of the following chip peripherals: I2C, a Universal Serial Bus (USB), a UART, an Analog to Digital Converter (ADC), a Joint Test Action Group (JTAG), a Real_Time Clock (RTC), a General Purpose Input/Output (GPIO), a Watch Dog Timer (WDT), a virtual UART, a super I/O, a Serial General Purpose Input/Output (SGPIO), Pulse Width Modulation (PWM), FanTach (fan speed regulation), a timer, a PECI, and a mailbox, and may also include the controllers of other types. There may be one or a plurality of external interfaces; and the external interface may include, but are not limited to, the external interface corresponding to any controller.

Figure 11:
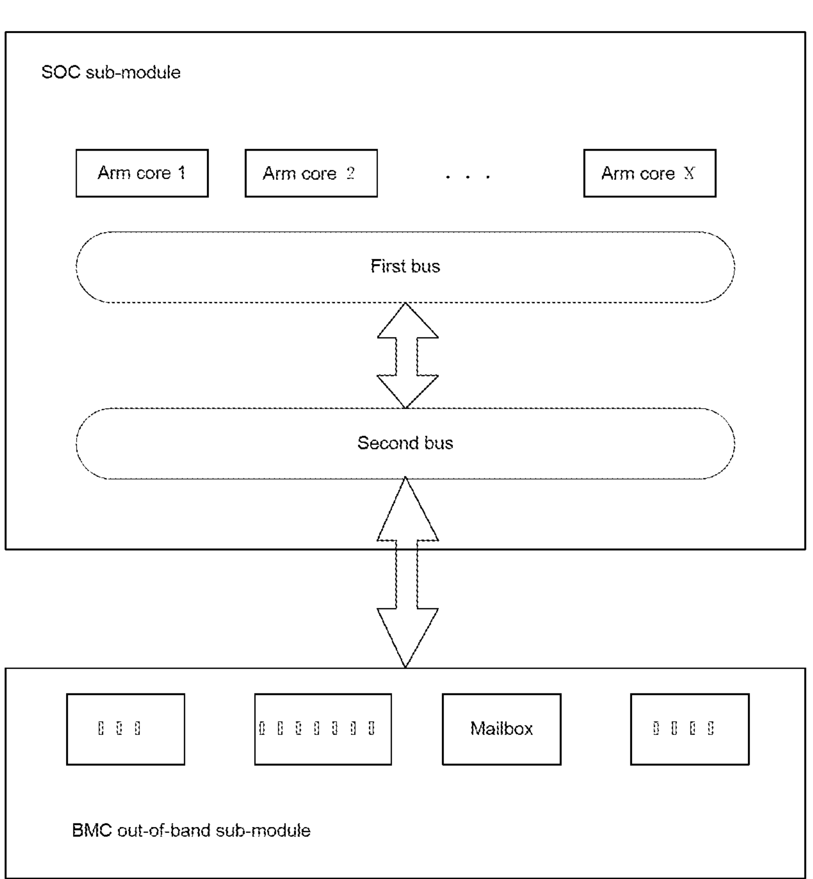
FIG. 11 is a schematic diagram of another optional embedded system according to an embodiment of the present application.

For example, an example of the BMC chip may be shown in FIG. 11. The hardware of the BMC chip may include, but is not limited to, an SOC sub-module and a BMC out-of-band sub-module. The SOC sub-module mainly includes ARM cores (ARM Core 1, ARM Core 2, . . . , ARM Core X), and may also include, but is not limited to, a (Double Data Rate) DDR 4 controller (memory controller), a Media Access Control Address (MAC) controller (network controller), a Secure Digital (SD) Card/Embedded Multi Media Card (eMMC) controller (storage controller), a PCIe Root Complex (RC) controller, a Static Random-Access Memory (SRAM), and a SPI controller.

The cores are connected to the controllers by the second bus, so as to implement interaction between the cores and the controllers. In addition, ARM cores are connected to the second bus (for example, the cores may be connected via an AXI bridge), and communication between cores is realized via the second bus. In addition, the interconnection between the second bus and the first bus is also realized in the SOC sub-module (for example, by means of the APB bridge). In this way, a physical path is provided for the SOC sub-module to access peripherals on the first bus.

The DDR4 controller may be connected to other components or devices through a DDR4 Physical Layer (PHY) interface. The MAC controller is connected to other components or devices through the Reduced Gigabit Media Independent Interface (RGMII). The SD card/eMMC controller is connected to other components or devices through the SD interface. The PCIe RC controller is connected to other components or devices through the PCIe PHY interface.

The BMC out-of-band sub-module mainly includes the controller corresponding to the chip peripherals such as a PWM, a GPIO, FanTach (fan speed regulation), and mailbox. Through these controllers, out-of-band management functions such as PECI communication of the BMC (for example, the use of the GPIO to simulate the PECI), and fan regulation can be realized. From FIG. 11, it may be learned that, the BMC out-of-band sub-module may implement, but is not limited to, the interaction with the SOC sub-module through the second bus.

The BMC chip implement the interaction among a on-chip ARM core, a storage unit, and a controller hardware resource through the first bus and the second bus. Dynamic balanced scheduling of the processor resources mainly involves the ARM core resource scheduling of the BMC chip; and inter-core communication refers to the communication performed between the ARM cores. For example, the Linux system occupies the cores of the RTOS. The Linux system first sends an inter-core interrupt (interrupt number 9) on a certain core of Core 2 to Core N to Core 1 by an on-chip second bus. If the current RTOS is in the idle state, occupation is allowed; Core 1 replies to an inter-core interrupt (interrupt number 10) via the second bus, and an external controller resource (for example, PWM/PECI) mapped by the current Core 1 is released; and the Linux system receives the inter-core interrupt 10, initiates an occupation flow, adds the Core 1 into Linux SMP scheduling, and obtains the control power of the PWM/PECI peripherals, which may be controlled via the first bus.

In one aspect, the at least two operating systems include the first operating system and the second operating system. The chip loads a communication value to the second bus, and the second bus sends a communication signal carrying the communication value to a communication register corresponding to the second operating system, so as to realize the communication between the first operating system and the second operating system, where the communication value is configured to indicate communication content between the first operating system and the second operating system.

In another aspect, the chip loads a control value to the second bus, and the first bus sends a control signal carrying the control value to a register corresponding to the hardware controller, so as to realize control of the hardware controller by the operating systems, where the control value is configured to indicate control content of the operating systems over the hardware controller.

The operating system controls the hardware controller by accessing (for example, executing a read operation and a write operation) the registers of each hardware controller. The mode that the operating system accesses the registers of the hardware controller may, but is not limited to, read or write the addresses of the registers of each hardware controller. These addresses of the registers may be, but is not limited to, unique and determined when the chip is designed. For example, a specific function (for example, a communication function between the operating systems or a control function of the operating system over the hardware controller) can be achieved by writing, by the operating system, a specific value (that is, the communication value or the control value) into a specific address (that is, the communication register or the register corresponding to the hardware controller). That is to say, different functions correspond to different control values, such that the correspondence relationship between the functions of the hardware controller and the control values is maintained in the chip. For example, a control value 00 means that an air conditioner accelerates by one gear; and a control value 01 means that the air conditioner decelerates by one gear, and so on.

Interactions such as communication and control between the operating systems and between the operating systems and the hardware controllers may, but are not limited to, be performed via the bus. The read and write operations of the operating system on the registers of the hardware controllers are eventually converted into control signals of the first bus (or the second bus) to the hardware controllers; and this part of the conversion work and the process of the control of the first bus (or the second bus) to the hardware controllers may be, but are not limited to, realized automatically by internal hardware of the chip. An implementation process follows bus specifications. During the operation process of the first bus (or the second bus), in one aspect, a physical signal related to a bus protocol may be transmitted and controlled; and in another aspect, valid data may be transmitted to the hardware controllers by a physical data channel.

Figure 12:
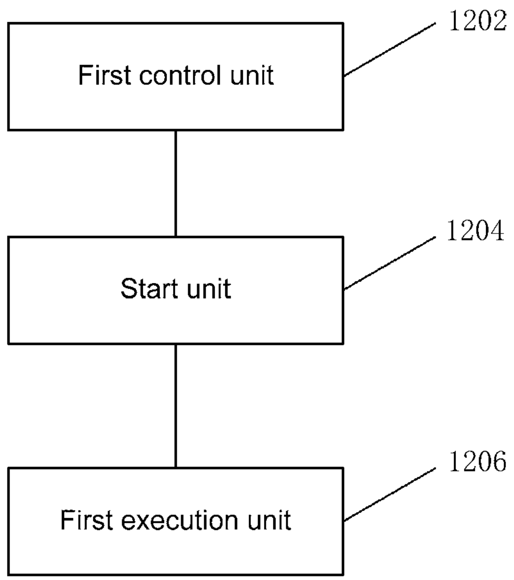
FIG. 12 is a structural block diagram of an optional embedded system start control apparatus according to an embodiment of the present application.

Still another aspect of an embodiment of the present application further provides an embedded system start control apparatus that is configured to implement the embedded system start control method. FIG. 12 is a structural block diagram of an optional embedded system start control apparatus according to an embodiment of the present application. As shown in FIG. 12, the apparatus includes a first control unit, a start unit, and a first execution unit.

The first control unit 1202 is configured to control, via a first bus, a hardware controller of a target device by a first operating system that runs on a first processor core of a processor, so as to control a running state of the target device, where an embedded system includes the first operating system.

The start unit 1204 is connected to the first control unit 1202, and is configured to boot a second processor core of the processor to start a second operating system, where the embedded system includes the second operating system, a response speed of the first operating system is higher than that of the second operating system, the first operating system communicates with the second operating system via a second bus, and the bandwidth of the second bus is higher than the bandwidth of the first bus.

The first execution unit 1206 is connected to the start unit 1204, and is configured to, after the second operating system is started, take over, by the second operating system, the hardware controller via the first bus, so as to take over the control power of the target device.

It is to be noted that, the first control unit 1202 in this embodiment may be configured to execute S202. The start unit 1204 in this embodiment may be configured to execute S204. The first execution unit 1206 in this embodiment may be configured to execute S206.

Through the above modules, the hardware controller of the target device is controlled, via the first bus, by the first operating system that runs on the first processor core of the processor, so as to control the running state of the target device; and the embedded system includes the first operating system. The second operating system is booted to start on the second processor core of the processor; the embedded system further includes the second operating system; the response speed of the first operating system is higher than that of the second operating system; the first operating system communicates with the second operating system via a second bus; and the bandwidth of the second bus is higher than the bandwidth of the first bus. After the second operating system is started, the hardware controller is taken over by the second operating system via the first bus, so as to take over the control power of the target device. Therefore, the problem that an operating system start control method in the related art is high in device cost due to the addition of an extra chip is solved, hardware costs are reduced, and the extendibility of device control is improved.

In an exemplary embodiment, the first control unit includes a first execution unit, a reading module, and a first sending module.

The first execution unit is configured to execute, on the first processor core, a first control task of the first operating system, where the first control task is configured to control the hardware controller.

The reading module is configured to read, by means of the first processor core, sensor data of a specific sensor corresponding to the target device.

The first sending module is configured to send, by means of the first control task, a device control instruction to the hardware controller via the first bus according to the sensor data of the specific sensor, so as to cause the hardware controller to control the running state of the target device according to the device control instruction.

In an exemplary embodiment, the first sending module includes a first determination sub-module and a sending sub-module.

The first determination sub-module is configured to determine, by means of the first control task, a target parameter value of a device running parameter of the target device according to the sensor data of the specific sensor, where the device running parameter is a parameter for controlling the running state of the target device.

The sending sub-module is configured to send, by means of the first control task, the device control instruction carrying the target parameter value to the hardware controller via the first bus. In an exemplary embodiment, the first determination sub-module includes a determination sub-unit.

The determination sub-unit is configured to, when the target device is a fan, determine, by means of the first control task, a target parameter value of a fan running parameter of the fan according to the sensor data of the specific sensor.

In an exemplary embodiment, the determination sub-unit includes a determination secondary sub-unit.

The determination secondary sub-unit is configured to, when the target device is the fan and the specific sensor is a temperature sensor, determine, by the first control task, a target rotary speed value of the rotary speed of the fan according to sensor data of the temperature sensor. The rotary speed of the fan is positively correlated with the temperature measured by the temperature sensor.

In an exemplary embodiment, the first execution unit includes a second sending module and a control module.

The second sending module is configured to send, by means of the second operating system, a first inter-core interrupt to the first operating system via the second bus, where the first inter-core interrupt is configured to request the second operating system to take over the hardware controller.

The control module is configured to control the hardware controller by means of a second control task of the second operating system via the first bus when a second inter-core interrupt that is returned by the first operating system in response to the first inter-core interrupt and is configured to indicate agreement to take over the hardware controller by the second operating system. The second operating system is configured to control the hardware controller.

In an exemplary embodiment, the apparatus further includes a second control unit and a first sending unit.

The second control unit is configured to, after the first inter-core interrupt is sent to the first operating system by means of the second operating system via the second bus, in response to the acquired first inter-core interrupt, control a third control task of the first operating system to hibernate, where the third control task is configured to control the hardware controller.

The first sending unit is configured to when the third control task has been hibernated, send, by the first operating system, the second inter-core interrupt to the second operating system via the second bus.

In an exemplary embodiment, the apparatus further includes a second execution unit.

The second execution unit is configured to, when the third control task has been hibernated, push system running data of the first operating system into a stack. The second inter-core interrupt is further configured to instruct the second operating system to take over the first processor core. In an exemplary embodiment, the apparatus further includes a wake-up unit and a running unit.

The wake-up unit is configured to, before the hardware controller of the target device is controlled, via the first bus, by the first operating system that runs on the first processor core of the processor, after a chip where the processor is located is powered on, wake up the first processor core by the processor.

The running unit is configured to run a boot loader of the first operating system by the first processor core, so as to boot the first operating system to start on the first processor core.

In an exemplary embodiment, the start unit includes a second execution module and a running module.

The second execution module is configured to execute an SPL by the first processor core, so as to cause the SPL to wake up the second processor core.

The running module is configured to run a U-Boot of the second operating system by the second processor core, so as to boot the second operating system to start on the first processor core.

In an exemplary embodiment, the apparatus further includes a third execution unit and a third control unit.

The third execution unit is configured to, after the hardware controller is taken over by the second operating system via the first bus, when the second operating system waits for restart, wake up the first operating system by the second operating system via the second bus, and take over the hardware controller by the first operating system via the first bus, so as to take over the control power of the target device.

The third control unit is configured to control the second operating system to perform system restart.

In an exemplary embodiment, the third execution unit includes an initiation module.

The initiation module is configured to, when the second operating system waits for restart, initiate a system wake-up interrupt to the first operating system by the second operating system via the second bus. The system wake-up interrupt is configured to wake up the first operating system.

In an exemplary embodiment, the apparatus further includes a first allocation unit, a first determination unit, and a second allocation unit.

The first allocation unit is configured to allocate, according to a dynamic resource allocation rule, a group of services to be allocated to the corresponding operating system in the first operating system and the second operating system, where the dynamic resource allocation rule includes performing dynamic resource allocation according to at least one of the following: a service response speed, a service resource occupation rate, a service coupling degree, or service importance.

The first determination unit is configured to determine resource allocation results corresponding to the group of services to be allocated, where the resource allocation results are configured to indicate a processing resource corresponding to each of the group of services to be allocated in processing resources of the processor, and the processing resources of the processor include processor cores.

The second allocation unit is configured to allocate the processing resources of the processor to the first operating system and the second operating system according to the operating system corresponding to each service to be allocated and the resource allocation results.

In an exemplary embodiment, the first allocation unit includes at least one of the following. The first allocation module is configured to allocate, to the first operating system, the services to be allocated of which service response speed in the group of services to be allocated is required to be greater than or equal to a set response speed threshold, and allocate, to the second operating system, the services to be allocated of which the service response speed in the group of services to be allocated is required to be less than the set response speed threshold.

The second allocation module is configured to allocate, to the first operating system, the services to be allocated of which service resource occupation rate in the group of services to be allocated is less than a first occupation rate threshold, and allocate, to the second operating system, the services to be allocated of which service resource occupation rate in the group of services to be allocated is greater than or equal to the first occupation rate threshold.

The third allocation module is configured to allocate, to a target operating system, the services to be allocated in the group of services to be allocated that include sensitive information. The target operating system is an operating system in the first operating system and the second operating system that has a low frequency of interaction with a use object.

In an exemplary embodiment, the first allocation unit includes at least one of the following. The fourth allocation module is configured to allocate, to the first operating system, the services to be allocated in the group of services to be allocated that have a service coupling degree with the allocated services of the first operating system being greater than or equal to a first coupling degree threshold.

The fifth allocation module is configured to allocate, to the second operating system, the services to be allocated in the group of services to be allocated that have a service coupling degree with the allocated services of the second operating system being greater than or equal to a second coupling degree threshold.

In an exemplary embodiment, the first determination unit includes a generation module.

The generation module is configured to, according to allocation results of the group of services to be allocated, in combination with resource utilization of processing resources of the first operating system and resource utilization of processing resources of the second operating system, generate a resource mapping table of the group of services to be allocated and the processing resources of the processor.

In an exemplary embodiment, the second allocation unit includes a sixth allocation module.

The sixth allocation module is configured to, when it is determined, according to the resource allocation results, that there are corresponding services to be allocated in unallocated processing resources in the processing resources of the processor, allocate the unallocated processing resources to the operating system to which the services to be allocated corresponding to the unallocated processing resources are allocated.

In an exemplary embodiment, the apparatus further includes a second sending unit, a third sending unit, and an acquisition unit.

The second sending unit is configured to send, by the first operating system, target data to a target virtual channel in a memory of the processor.

The third sending unit is configured to send an interrupt notification message to the second operating system.

The acquisition unit is configured to acquire, by the second operating system, the target data from the target virtual channel in the memory in response to the interrupt notification message.

In an exemplary embodiment, the memory includes a data storage area and a metadata storage area. The data storage area is divided into a plurality of storage units, and each storage unit is configured to store the service data. The metadata storage area is configured to store the size and occupied state of each storage unit of the data storage area.

In an exemplary embodiment, the second sending unit includes a third execution module and a fourth execution module.

The third execution module is configured to read records in the metadata storage area by the first operating system, and determine, according to the read records, at least one storage unit that is in an idle state in the data storage area and has a total space being greater than or equal to the length of the target data, so as to obtain the target virtual channel.

The fourth execution module is configured to set, to the occupied state, the state of the at least one storage unit corresponding to the target virtual channel in the metadata storage area, and store the target data to the target virtual channel.

In an exemplary embodiment, the acquisition unit includes a fifth execution module and a sixth execution module.

The fifth execution module is configured to read the records in the metadata storage area by the second operating system, and determine the target virtual channel according to the read records.

The sixth execution module is configured to acquire the target data from the at least one storage unit corresponding to the target virtual channel, and set the state of the at least one storage unit to the idle state.

In an exemplary embodiment, the data storage area includes a plurality of memory channels, and each memory channel is formed by one or the plurality of storage units. The metadata storage area stores a plurality of records, and each record is configured to record metadata of one memory channel. The metadata of each memory channel at least includes a channel ID of the memory channel, the size of the memory channel, and the occupied state of the memory channel. The third execution module includes a first traversing sub-module and a second determination sub-module.

The first traversing sub-module is configured to traverse the records stored in the metadata storage area, and determine whether there is a first target record indicating that the memory channel is in the idle state and the size of the memory channel is greater than or equal to the length of the target data.

The second determination sub-module is configured to, when there is the first target record, determine, as the target virtual channel, the memory channel indicated by the channel ID recorded in the first target record.

In an exemplary embodiment, when the memory channel is occupied, the metadata of the memory channel further includes the ID of a source CPU core of the target data and the ID of a destination CPU core of the target data. The fifth execution module includes a second traversing sub-module and a third determination sub-module.

The second traversing sub-module is configured to traverse the records stored in the metadata storage area, and determine whether there is a second target record, where the second target record indicates that the memory channel is in the occupied state, and the ID of the destination CPU core is the ID of a CPU core of the second operating system, and the ID of the source CPU core is not the ID of the CPU core of the second operating system.

The third determination sub-module is configured to, when there is the second target record, determine, as the target virtual channel, the memory channel indicated by the channel ID recorded in the second target record.

In an exemplary embodiment, the apparatus further includes a fourth execution unit, a fifth execution unit, and a feedback unit.

The fourth execution unit is configured to receive a memory request instruction of the first operating system, and execute a locking operation on the memory of the processor, where the memory request instruction is configured to request to use the memory of the processor.

The fifth execution unit is configured to, when the memory is successfully locked, read the occupied state of the memory, and determine, according to the occupied state of the memory, whether there is an idle target memory space in the memory, where the size of the target memory space is greater than or equal to the size of the memory requested by the memory request instruction.

The feedback unit is configured to, when there is the target memory space in the memory, feed back address information of the target memory space to the first operating system, and update the occupied state of the memory.

In an exemplary embodiment, the memory includes a metadata storage area and a data storage area; the data storage area is configured to store service data; the metadata storage area stores a state mapping table, and the state mapping table is configured to record an occupied state of the data storage area. The fifth execution unit includes a seventh execution module.

The seventh execution module is configured to read records in the state mapping table from the metadata storage area, and determine, according to the records in the state mapping table, whether there is the target memory space in the data storage area.

In an exemplary embodiment, the apparatus further includes a determination unit and a sixth execution unit.

The determination unit is configured to, before the locking operation is executed on the memory of the processor, determine whether the memory is currently in a locked state, where the locked state represents that the memory is in the state of being requested for use.

The sixth execution unit is configured to, when the memory is currently not in the locked state, execute the locking operation on the memory.

In an exemplary embodiment, the apparatus further includes a releasing unit.

The releasing unit is configured to, after the occupied state of the memory is read, and whether there is the idle target memory space in the memory is determined according to the occupied state of the memory, release the locking of the memory when there is no idle target memory space in the memory.

It is to be noted that, each of the above modules may be implemented by software or hardware. For the latter, it may be implemented in the following manners, but is not limited to the follow: the above modules are all located in a same processor; or the above modules are located in different processors in any combination.

An embodiment of the present application further provides a chip. The chip includes a programmable logic circuit and at least one of executable instructions. The chip runs in an electronic device and is configured to implement steps in any one of the above method embodiments.

An embodiment of the present application further provides a BMC chip. The BMC chip may include a storage unit and a processing unit connected to the storage unit. The storage unit is configured to store a program; and the processing unit is configured to run the program to execute steps in any one of the above method embodiments.

An embodiment of the present application further provides a mainboard. The mainboard includes: at least one processor; and at least one memory, configured to store at least one program. When the at least one program is executed by the at least one processor, the at least one processor is enabled to implement steps in any one of the above method embodiments.

An embodiment of the present application further provides a server, which includes a processor, a communication interface, a memory, and a communication bus. The processor, the communication interface, and the memory communicate with each other by means of the communication bus. The memory is configured to store a computer program. The processor is configured to implement steps in any one of the above method embodiments when executing the program stored in the memory, so as to achieve the same technical effect.

The communication bus of the server may be a Peripheral Component Interconnect (PCI) bus or an Extended Industry Standard Architecture (EISA) bus, etc. The communication bus may be divided into an address bus, a data bus, a control bus, and the like. The communication interface is configured to achieve communication between the server and other devices.

The memory may include an RAM, or may include a Non-Volatile Memory (NVM), such as at least one disk memory. Optionally, the memory may also be at least one storage apparatus located remotely from the foregoing processor. The above processor may be a general processor, including a Central Processing Unit (CPU) and a Network Processor (NP), or may be a Digital Signal Processor (DSP), an Application Specific Integrated Circuit (ASIC), a Field-Programmable Gate Array (FPGA) or other programmable logic devices, discrete gate or transistor logic devices, and discrete hardware components.

An embodiment of the present application further provides a computer-readable storage medium. The computer-readable storage medium stores a computer program. Steps in any one of the above method embodiments are executed when the computer program is configured to run.

In an exemplary embodiment, the computer-readable storage medium may include, but is not limited to, a USB flash disk, a Read-Only Memory (ROM), a Random Access Memory (RAM), and various media that can store computer programs, such as a mobile hard disk, a magnetic disk, or an optical disk.

An embodiment of the present application further provides an electronic device. The electronic device includes a memory and a processor. The memory is configured to store a computer program. The processor is configured to run the computer program to execute steps in any one of method embodiments described above.

In an exemplary embodiment, the electronic device may further include a transmission device and an input/output device. The transmission device is connected to the processor. The input/output device is connected to the processor.

For specific examples in this embodiment, refer to the examples described in the foregoing embodiments and the exemplary implementations, and this embodiment will not be repeated thereto.

It is apparent that those skilled in the art should understand that the above modules or steps of the present application may be implemented by a general computing device, and may also be gathered together on a single computing device or distributed in network composed of multiple computing devices. The above mentioned modules or steps of the present application may be implemented with program codes executable by the computing device, so that may be stored in a storage device for execution by the computing device, and in some cases, the steps shown or described may be performed in a different sequence than herein, or can be fabricated into individual integrated circuit modules respectively, or multiple modules or steps thereof are fabricated into a single integrated circuit module for implementation. In this way, the present application is not limited to any specific combination of hardware and software.

The above are only the optional embodiments of the present application and are not intended to limit the present application. For those skilled in the art, the present application may have various modifications and variations. Any modifications, equivalent replacements, improvements and the like made within the principle of the present application shall fall within the scope of protection of the present application.

What is claimed is:

1. An embedded system start control method, comprising:

controlling, via a first bus, a hardware controller of a target device by a first operating system that runs on a first processor core of a processor, so as to control a running state of the target device, wherein an embedded system comprises the first operating system;

booting a second operating system to start on a second processor core of the processor, wherein the embedded system comprises the second operating system, a response speed of the first operating system is higher than a response speed of the second operating system, the first operating system communicates with the second operating system via a second bus, and a bandwidth of the second bus is higher than a bandwidth of the first bus; and after the second operating system is started, taking over, by the second operating system, the hardware controller via the first bus, so as to take over control power of the target device, wherein the embedded system start control method further comprises:

maintaining in memory of the processor a data storage area and a metadata storage area, wherein the data storage area is divided into a plurality of storage units, and each storage unit is configured to store service data, and the metadata storage area is configured to store size and occupied state of each storage unit of the data storage area, wherein the data storage area further comprises a plurality of memory channels, and each memory channel is formed by one or more of the plurality of storage units, wherein the metadata storage area stores a plurality of records, and each record is configured to record metadata of one memory channel, and wherein the metadata of each memory channel at least comprises a channel ID of the memory channel, the size of the memory channel, and the occupied state of the memory channel;

responsive to determination that the first operating system needs to transmit a target data to the second operating system, sending, by the first operating system, the target data to a target virtual channel in the memory of the processor, wherein sending further comprises:

reading records in the metadata storage area by the first operating system, and determining, according to the read records, at least one storage unit that is in an idle state in the data storage area and has a total space being greater than or equal to the length of target data, so as to obtain the target virtual channel, wherein determining further comprises traversing the records stored in the metadata storage area, and determining whether there is a first target record indicating that the memory channel is in the idle state and the size of the memory channel is greater than or equal to the length of the target data, and when there is the first target record, determining, as the target virtual channel, the memory channel indicated by the channel ID recorded in the first target record; and setting, to the occupied state, a state of each of the at least one storage unit corresponding to the target virtual channel in the metadata storage area, and storing the target data to the target virtual channel;

sending an interrupt notification message to the second operating system; and acquiring, by the second operating system, the target data from the target virtual channel in the memory in response to the interrupt notification message.

2. The embedded system start control method according to claim 1, wherein controlling, via the first bus, the hardware controller of the target device by the first operating system that runs on the first processor core of the processor comprises:

executing, on the first processor core, a first control task of the first operating system, wherein the first control task is configured to control the hardware controller;

reading, by means of the first processor core, sensor data of a specific sensor corresponding to the target device; and sending, by means of the first control task, a device control instruction to the hardware controller via the first bus according to the sensor data of the specific sensor, so as to cause the hardware controller to control the running state of the target device according to the device control instruction.

3. The embedded system start control method according to claim 2, wherein sending, by means of the first control task, the device control instruction to the hardware controller via the first bus according to the sensor data of the specific sensor comprises:

determining, by means of the first control task, a target parameter value of a device running parameter of the target device according to the sensor data of the specific sensor, wherein the device running parameter is a parameter for controlling the running state of the target device; and sending, by means of the first control task, the device control instruction carrying the target parameter value to the hardware controller via the first bus.

4. The embedded system start control method according to claim 3, wherein determining, by means of the first control task, the target parameter value of the device running parameter of the target device according to the sensor data of the specific sensor comprises:

when the target device is a fan, determining, by means of the first control task, a target parameter value of a fan running parameter of the fan according to the sensor data of the specific sensor.

5. The embedded system start control method according to claim 4, wherein when the target device is the fan, determining, by means of the first control task, the target parameter value of the fan running parameter of the fan according to the sensor data of the specific sensor comprises:

when the target device is the fan and the specific sensor is a temperature sensor, determining, by the first control task, a target rotary speed value of rotary speed of the fan according to sensor data of the temperature sensor, wherein the rotary speed of the fan is positively correlated with temperature measured by the temperature sensor.

6. The embedded system start control method according to claim 1, wherein taking over, by the second operating system, the hardware controller via the first bus comprises:

sending, by means of the second operating system, a first inter-core interrupt to the first operating system via the second bus, wherein the first inter-core interrupt is configured to request the second operating system to take over the hardware controller; and controlling the hardware controller by means of a second control task of the second operating system via the first bus when a second inter-core interrupt that is returned by the first operating system in response to the first inter-core interrupt and is configured to indicate agreement to take over the hardware controller by the second operating system, wherein the second operating system is configured to control the hardware controller.

7. The embedded system start control method according to claim 6, wherein after the first inter-core interrupt is sent to the first operating system by means of the second operating system via the second bus, the method further comprises:

in response to the acquired first inter-core interrupt, controlling a third control task of the first operating system to hibernate, wherein the third control task is configured to control the hardware controller; and when the third control task has been hibernated, sending, by the first operating system, the second inter-core interrupt to the second operating system via the second bus.

8. The embedded system start control method according to claim 1, wherein:

before the hardware controller of the target device is controlled, via the first bus, by the first operating system that runs on the first processor core of the processor, the method further comprises: after a chip where the processor is located is powered on, waking up the first processor core by the processor; and running a boot loader of the first operating system by the first processor core, so as to boot the first operating system to start on the first processor core, or booting the second operating system to start on the second processor core of the processor comprises:

executing a Second Program Loader (SPL) by the first processor core, so as to cause the SPL to wake up the second processor core; and running a Universal Boot Loader (U-Boot) of the second operating system by the second processor core, so as to boot the second operating system to start on the first processor core, or after the hardware controller is taken over by the second operating system via the first bus, the method further comprises:

when the second operating system waits for restart, waking up the first operating system by the second operating system via the second bus, and taking over the hardware controller by the first operating system via the first bus, SO as to take over the control power of the target device; and controlling the second operating system to perform system restart.

9. The embedded system start control method according to claim 1, further comprising:

allocating, according to a dynamic resource allocation rule, a group of services to be allocated to the corresponding operating system in the first operating system and the second operating system, wherein the dynamic resource allocation rule comprises performing dynamic resource allocation according to at least one of the following: a service response speed, a service resource occupation rate, a service coupling degree, or service importance;

determining resource allocation results corresponding to the group of services to be allocated, wherein the resource allocation results are configured to indicate a processing resource corresponding to each service of the group of services in processing resources of the processor, and the processing resources of the processor comprise processor cores; and allocating the processing resources of the processor to the first operating system and the second operating system according to the operating system corresponding to each service to be allocated and the resource allocation results.

10. The embedded system start control method according to claim 9, wherein the dynamic resource allocation rule allocates the group of services to be allocated to the corresponding operating system in the embedded system, and comprises at least one of the follows:

allocating, to the first operating system, services to be allocated of which service response speed in the group of services to be allocated is required to be greater than or equal to a set response speed threshold, and allocating, to the second operating system, services to be allocated of which the service response speed in the group of services to be allocated is required to be less than the set response speed threshold;

allocating, to the first operating system, services to be allocated of which service resource occupation rate in the group of services to be allocated is less than a first occupation rate threshold, and allocating, to the second operating system, services to be allocated of which service resource occupation rate in the group of services to be allocated is greater than or equal to the first occupation rate threshold; and allocating, to a target operating system, services to be allocated in the group of services to be allocated that comprise sensitive information, wherein the target operating system is an operating system in the first operating system and the second operating system that has a low frequency of interaction with a use object, or the dynamic resource allocation rule allocates the group of services to be allocated to the corresponding operating system in the embedded system, and comprises at least one of the follows:

allocating, to the first operating system, services to be allocated in the group of services to be allocated that have a service coupling degree with allocated services of the first operating system being greater than or equal to a first coupling degree threshold; and allocating, to the second operating system, services to be allocated in the group of services to be allocated that have a service coupling degree with allocated services of the second operating system being greater than or equal to a second coupling degree threshold, or determining resource allocation results corresponding to the group of services to be allocated comprises:

according to allocation results of the group of services to be allocated, in combination with resource utilization of processing resources of the first operating system and resource utilization of processing resources of the second operating system, generating a resource mapping table of the group of services to be allocated and the processing resources of the processor, or allocating the processing resources of the processor to the first operating system and the second operating system according to the operating system corresponding to each service to be allocated and the resource allocation results comprises:

when it is determined, according to the resource allocation results, that there are corresponding services to be allocated in unallocated processing resources in the processing resources of the processor, allocating the unallocated processing resources to the operating system to which the services to be allocated corresponding to the unallocated processing resources are allocated.

11. The embedded system start control method according to claim 1, wherein acquiring, by the second operating system, the target data from the target virtual channel in the memory in response to the interrupt notification message comprises:

reading the records in the metadata storage area by the second operating system, and determining the target virtual channel according to the read records; and acquiring the target data from the at least one storage unit corresponding to the target virtual channel, and setting the state of the at least one storage unit to the idle state.

12. The embedded system start control method according to claim 7, wherein when the memory channel is occupied, the metadata of the memory channel further comprises a ID of a source CPU core of the target data and a ID of a destination CPU core of the target data; and reading the records in the metadata storage area by the second operating system, and determining the target virtual channel according to the read records comprises:

traversing the records stored in the metadata storage area, and determining whether there is a second target record, wherein the second target record indicates that the memory channel is in the occupied state, and the ID of the destination CPU core is a ID of a CPU core of the second operating system, and the ID of the source CPU core is not the ID of the CPU core of the second operating system; and when there is the second target record, determining, as the target virtual channel, the memory channel indicated by the channel ID recorded in the second target record.

13. The embedded system start control method according to claim 1, further comprising:

receiving a memory request instruction of the first operating system, and executing a locking operation on the memory of the processor, wherein the memory request instruction is configured to request to use the memory of the processor;

when the memory is successfully locked, reading the occupied state of the memory, and determining, according to the occupied state of the memory, whether there is an idle target memory space in the memory, wherein the size of the target memory space is greater than or equal to the size of the memory requested by the memory request instruction; and when there is the target memory space in the memory, feeding back address information of the target memory space to the first operating system, and updating the occupied state of the memory.

14. The embedded system start control method according to claim 13, wherein the memory comprises a metadata storage area and a data storage area; the data storage area is configured to store service data; the metadata storage area stores a state mapping table, and the state mapping table is configured to record an occupied state of the data storage area; and reading the occupied state of the memory, and determining, according to the occupied state of the memory, whether there is the idle target memory space in the memory comprises:

reading records in the state mapping table from the metadata storage area, and determining, according to the records in the state mapping table, whether there is the target memory space in the data storage area, or before the locking operation is executed on the memory of the processor, the method further comprises: determining whether the memory is currently in a locked state, wherein the locked state represents that the memory is in a state of being requested for use; and when the memory is currently not in the locked state, executing the locking operation on the memory, or after the occupied state of the memory is read, and whether there is the idle target memory space in the memory is determined according to the occupied state of the memory, the method further comprises:

releasing the locking of the memory when there is no the idle target memory space in the memory.

15. An embedded system, comprising a chip, a memory and at least two operating systems, wherein the chip comprises a processor, a hardware controller, a first bus, and a second bus;

a bandwidth of the second bus is higher than a bandwidth of the first bus, the second bus is configured as a multi-master and multi-slave mode, and the first bus is configured as a one-master and multi-slave mode;

the at least two operating systems run on the basis of the processor, wherein processing resources of the processor are dynamically allocated to the at least two operating systems, and the processing resources of the processor comprise processor cores;

the at least two operating systems communicate with each other by means of the second bus;

the at least two operating systems control the hardware controller by means of the first bus; and the at least two operating systems are configured to:

control, via a first bus, a hardware controller of a target device by a first operating system that runs on a first processor core of a processor, so as to control a running state of the target device, wherein an embedded system comprises the first operating system;

boot a second operating system to start on a second processor core of the processor, wherein the embedded system comprises the second operating system, a response speed of the first operating system is higher than a response speed of the second operating system, the first operating system communicates with the second operating system via a second bus, and a bandwidth of the second bus is higher than a bandwidth of the first bus; and after the second operating system is started, take over, by the second operating system, the hardware controller via the first bus, so as to take over control power of the target device, wherein the memory comprises a data storage area and a metadata storage area, wherein the data storage area is divided into a plurality of storage units, and each storage unit is configured to store service data, and the metadata storage area is configured to store size and occupied state of each storage unit of the data storage area, wherein the data storage area further comprises a plurality of memory channels, and each memory channel is formed by one or more of the plurality of storage units, wherein the metadata storage area stores a plurality of records, and each record is configured to record metadata of one memory channel, and wherein the metadata of each memory channel at least comprises a channel ID of the memory channel, the size of the memory channel, and the occupied state of the memory channel; and wherein the at least two operating systems are further configured to:

send, by the first operating system, the target data to a target virtual channel in the memory of the processor responsive to determination that the first operating system needs to transmit a target data to the second operating system, wherein sending comprises:

reading records in the metadata storage area by the first operating system, and determining, according to the read records, at least one storage unit that is in an idle state in the data storage area and has a total space being greater than or equal to the length of target data, so as to obtain the target virtual channel, wherein determining further comprises traversing the records stored in the metadata storage area, and determining whether there is a first target record indicating that the memory channel is in the idle state and the size of the memory channel is greater than or equal to the length of the target data, and when there is the first target record, determining, as the target virtual channel, the memory channel indicated by the channel ID recorded in the first target record; and setting, to the occupied state, a state of each of the at least one storage unit corresponding to the target virtual channel in the metadata storage area, and storing the target data to the target virtual channel;

send an interrupt notification message to the second operating system; and acquire, by the second operating system, the target data from the target virtual channel in the memory in response to the interrupt notification message.

16. A chip, comprising a programmable logic circuit and at least one of executable instructions, wherein the chip runs in an electronic device and is configured to:

control, via a first bus, a hardware controller of a target device by a first operating system that runs on a first processor core of a processor, so as to control a running state of the target device, wherein an embedded system comprises the first operating system;

boot a second operating system to start on a second processor core of the processor, wherein the embedded system comprises the second operating system, a response speed of the first operating system is higher than a response speed of the second operating system, the first operating system communicates with the second operating system via a second bus, and a bandwidth of the second bus is higher than a bandwidth of the first bus; and after the second operating system is started, take over, by the second operating system, the hardware controller via the first bus, so as to take over control power of the target device, wherein a memory of the processor comprises a data storage area and a metadata storage area, wherein the data storage area is divided into a plurality of storage units, and each storage unit is configured to store service data, and the metadata storage area is configured to store size and occupied state of each storage unit of the data storage area, wherein the data storage area further comprises a plurality of memory channels, and each memory channel is formed by one or more of the plurality of storage units, wherein the metadata storage area stores a plurality of records, and each record is configured to record metadata of one memory channel, and wherein the metadata of each memory channel at least comprises a channel ID of the memory channel, the size of the memory channel, and the occupied state of the memory channel; and wherein the chip is further configured to:

send, by the first operating system, the target data to a target virtual channel in the memory of the processor in response to determination that the first operating system needs to transmit a target data to the second operating system, wherein sending further comprises:

reading records in the metadata storage area by the first operating system, and determining, according to the read records, at least one storage unit that is in an idle state in the data storage area and has a total space being greater than or equal to the length of target data, so as to obtain the target virtual channel, wherein determining further comprises traversing the records stored in the metadata storage area, and determining whether there is a first target record indicating that the memory channel is in the idle state and the size of the memory channel is greater than or equal to the length of the target data, and when there is the first target record, determining, as the target virtual channel, the memory channel indicated by the channel ID recorded in the first target record; and setting, to the occupied state, a state of each of the at least one storage unit corresponding to the target virtual channel in the metadata storage area, and storing the target data to the target virtual channel;

send an interrupt notification message to the second operating system; and acquire, by the second operating system, the target data from the target virtual channel in the memory in response to the interrupt notification message.

* * * * *